United States Patent
Furuichi et al.

(10) Patent No.: US 8,090,501 B2
(45) Date of Patent: Jan. 3, 2012

(54) CONTROL DEVICE FOR A VARIABLE DAMPER

(75) Inventors: Takashi Furuichi, Wako (JP); Takafumi Kato, Wako (JP); Toshimitsu Kaji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 595 days.

(21) Appl. No.: 12/255,169

(22) Filed: Oct. 21, 2008

(65) Prior Publication Data

US 2009/0112402 A1 Apr. 30, 2009

(30) Foreign Application Priority Data

| Oct. 26, 2007 | (JP) | 2007-278361 |
| Jan. 29, 2008 | (JP) | 2008-017613 |
| Mar. 5, 2008 | (JP) | 2008-055304 |
| May 7, 2008 | (JP) | 2008-121368 |

(51) Int. Cl.
*B60G 17/016* (2006.01)

(52) U.S. Cl. ............ 701/38; 280/5.512

(58) Field of Classification Search .......... 701/37, 701/38; 280/5.5, 5.512, 5.514, 5.515
See application file for complete search history.

(56) References Cited

U.S. PATENT DOCUMENTS

| 5,642,899 | A * | 7/1997 | Inoue et al. ............. 280/5.515 |
| 5,944,763 | A * | 8/1999 | Iwasaki ............. 701/37 |
| 7,035,836 | B2 * | 4/2006 | Caponetto et al. ........... 706/47 |
| 7,770,701 | B1 * | 8/2010 | Davis ............. 188/267.1 |
| 7,900,938 | B2 * | 3/2011 | Sano ............. 280/5.502 |
| 2006/0064223 | A1 * | 3/2006 | Voss ............. 701/52 |
| 2008/0234896 | A1 * | 9/2008 | Kato et al. ............. 701/37 |
| 2008/0249690 | A1 * | 10/2008 | Matsumoto et al. ........... 701/48 |
| 2008/0284118 | A1 * | 11/2008 | Venton-Walters et al. 280/6.154 |
| 2009/0319114 | A1 * | 12/2009 | Takenaka et al. ............. 701/29 |

FOREIGN PATENT DOCUMENTS

JP 2006-069527 3/2006

* cited by examiner

*Primary Examiner* — Faye M. Fleming

(74) *Attorney, Agent, or Firm* — Rankin, Hill & Clark LLP

(57) ABSTRACT

A control device for controlling a variable damper of a wheel suspension system includes a first sensor detecting a first dynamic state variable of a vehicle body, a damping force base value determining unit determining a target damping force base value, a second sensor detecting a second dynamic state variable of the vehicle body; a correction value determining unit determining a damping force correction value, and a target damping force determining unit determining a target damping force. When the differential value of the lateral acceleration is relatively high (or the target damping force is high), a drive current to the variable damper is increased. The same is true when the vehicle is undergoing a pitching movement. The target damping force may be obtained by subtracting the damping force correction value from the target damping force base value.

20 Claims, 36 Drawing Sheets

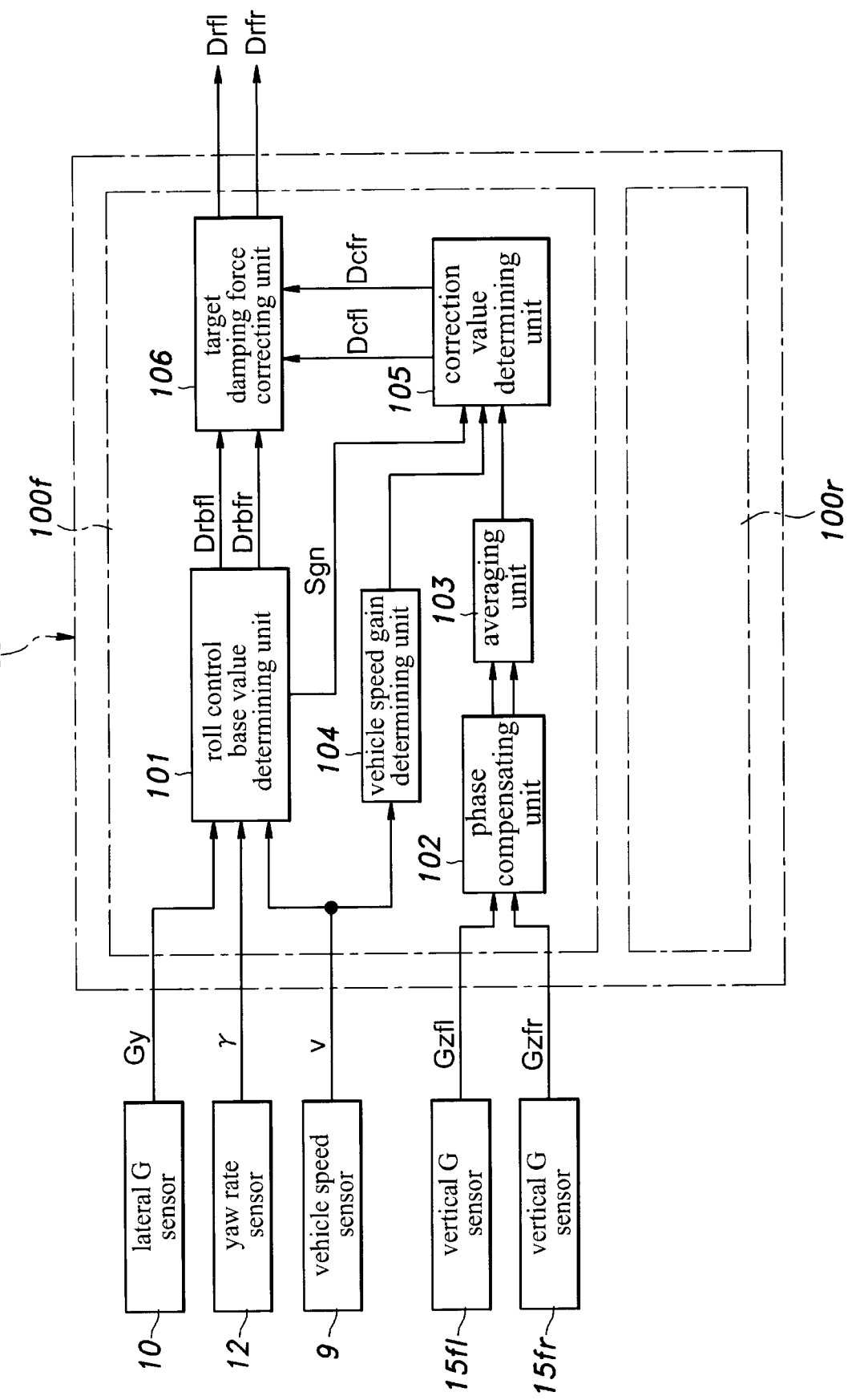

CONTROL DEVICE FOR A VARIABLE DAMPER

TECHNICAL FIELD

The present invention relates to a control device for a variable shock absorber or damper, and in particular to a technology for achieving both a favorable ride quality and high motion stability. The present invention is highly advantageous in providing a favorable ride quality even when the vehicle is traveling over an irregular road surface and ensuring a high motion stability even when the vehicle changes lanes or makes quick turns.

BACKGROUND OF THE INVENTION

Various forms of variable dampers have been proposed for use in wheel suspension systems for the purposes of improving the ride quality and achieving a favorable motion stability of the vehicle. Typically, such a variable damper may be formed as a tubular shock absorber using magneto-rheological fluid (MRF) for the actuating fluid of the damper so that the viscosity of the fluid may be varied by supplying corresponding electric current to a magnetized liquid valve (MLV) which is incorporated in the piston. The damping force property of such a variable damper can be varied either in a stepwise fashion or, more favorably, in a continuous manner.

For instance, a rolling movement of a vehicle as it makes a turn owing to a lateral acceleration of the vehicle (owing to the inertia force) can be prevented from becoming excessive by increasing the target damping force of the dampers in dependence of the increase rate (time differential) of the lateral acceleration. Also, the rider quality of a vehicle as it travels over an irregular road surface can be improved by reducing the target damping force of the dampers by detecting a rapid vertical up and down movement of the wheels or a high stroke speed of the wheels. Thereby, the vertical movement of the wheels is prevented from being transmitted to the vehicle body. See Japanese patent laid open publication No. 2006-69527.

However, according to the method disclosed in this Japanese patent publication, when the differential value of the lateral acceleration is large (or the target damping force is high) when the vehicle is cornering or changing lanes, the resulting increase in the damper force prevents the movement of the damper that otherwise would insulate the irregularities of the road surface to the vehicle body, and this adversely affects the ride quality of the vehicle.

A vehicle undergoes a rolling movement when cornering a curve or change lanes, and a pitching movement when decelerating. For the vehicle to able to travel in a stable manner, it is desirable to increase the damping forces of the suspension systems when the vehicle is rolling and/or pitching. On the other hand, the damping forces of the dampers are desired to be small for the vehicle to ensure a favorable ride quality on irregular road surfaces. It is conceivable to control the damping forces of the dampers according to the vertical accelerations of the vehicle body such as wheelhouses of the vehicle. However, as it is difficult to determine if any particular increase in the vertical acceleration of any particular vehicle part is due to a rolling or pitching movement of the vehicle or the irregularities of the road surface.

When a wheel moves up and down owing to the irregularities of a road surface, this up and down movement is transmitted to the vehicle body via the suspension system (spring and damper). Therefore, even when a signal to reduce the damping force is forwarded to any particular damper according to the vertical movement of the vehicle body, there is so much response delay that the rider quality of the vehicle may not be improved. Also, when the response speed of the variable damper is not high, this adds to the problem.

During a cornering movement, the vehicle body rolls outwardly of the curve, and the spring of the suspension system of the outer wheel is compressed and produces a greater spring force while the spring for the inner wheel is extends and produces a smaller spring force. As a result, the outer wheel is prevented from readily displacing vertically and this may impair the ride quality while the inner wheel becomes so readily displacing vertically that the control of the rolling movement of the vehicle body may be impaired.

BRIEF SUMMARY OF THE INVENTION

In view of such problems of the prior art and based on such recognition by the inventor, a primary object of the present invention is to provide a control device for a variable damper that can ensure a favorable rider quality even when the vehicle is traveling over an irregular road surface.

A second object of the present invention is to provide a control device for a variable damper that can favorably control the rolling and/or pitching movement of the vehicle.

According to the present invention, such objects can be at least partly accomplished by providing a control device for controlling a variable damper of a wheel suspension system, comprising: a first sensor detecting a first dynamic state variable of a vehicle body; a damping force base value determining unit determining a target damping force base value according to the first dynamic state variable of the vehicle body; a second sensor detecting a second dynamic state variable of the vehicle body different from the first dynamic state variable; a correction value determining unit determining a damping force correction value according to the detected second dynamic state variable; and a target damping force determining unit determining a target damping force by modifying the target damping force base value by using the damping force correction value.

Thus, when the differential value of the lateral acceleration is relatively high (or the target damping force is high), a drive current to the variable damper is increased so that the resistance to the extension and retraction of the damper is increased, and this prevents the ride quality to be impaired when the vehicle is cornering. The same is true when the vehicle is undergoing a pitching movement. According to a preferred embodiment of the present invention, the target damping force is obtained simply by subtracting the damping force correction value from the target damping force base value. Typically, the second state variable comprises a vertical acceleration of a wheel supported by the wheel suspension system.

According to a certain aspect of the present invention, the damping force base value includes a first damping force base value based on a roll movement of the vehicle body and a second damping force base value based on a vertical movement of the vehicle body, and the control device further comprises a target damping force selecting unit selecting one of the first and second damping force base values according to a prescribed criteria, the target damping force determining unit determining the target damping force by modifying one of the first and second damping force base values selected by the target damping force selecting unit by using the other of the first and second damping force base values when the first and second damping force base values differ from each other in sign.

Thus, for instance, when the first damping force base value is selected as the target damping force when the vehicle is traveling in a slalom pattern, and the vehicle is subjected to a vertical force owing to the irregularities of the road surface, the first damping force base value is modified or corrected by the second damping force base value so that the ride quality is prevented from being impaired by suitably reducing the damping force. Typically, the target damping force selecting unit selects one of the first and second damping force base values that is greater than the other when a stroke speed of the damper is positive in value, and one of the first and second damping force base values that is smaller than the other when a stroke speed of the damper is negative in value.

Preferably, the correction value determining unit computes the damping force correction value by multiplying a prescribed gain to the second damping force base value, and the target damping force determining unit determines the target damping force by adding the damping force correction value to the target damping force base value. Thereby, by suitably selecting the value of the gain, the motion stability and ride quality can be both achieved in a favorable manner.

According to another aspect of the present invention, the damping force base value further includes a third damping force base value based on a pitch movement of the vehicle body, and the target damping force selecting unit selects one of the first to third damping force base values according to a prescribed criteria, the target damping force being modified by using the second damping force base value when the third damping force base value is selected as the target damping force by the target damping force selecting unit, and the second and third damping force base values differ from each other in sign.

Thus, for instance, when the third damping force base value is selected as the target damping force owing to the pitching movement of the vehicle (such as when the vehicle is decelerating), and the vehicle body is subjected to an up and down movement owing to the irregularities of the road surface, the target damping force is modified by the second damping force base value, and the damping force is reduced so that the ride quality is prevented from being impaired. Typically, the target damping force selecting unit selects a largest of the first to third damping force base values in value when a stroke speed of the damper is positive in value, and a smallest of the first to third damping force base values in value when a stroke speed of the damper is negative in value.

According to a preferred embodiment of the present invention, a spring member is interposed between the wheel and vehicle body, and the target damping force determining unit modifies the target damping force by using the second damping force base value and a spring force produced by the spring member.

Thus, even when the spring force of the spring member changes owing to changes in the attitude of the vehicle, the target damping force is varied in a corresponding manner so that the ride quality is not impaired and the motion stability of the vehicle is ensured. The spring force can be readily estimated from a detected deformation of the spring member or a relative displacement between the wheel and vehicle body.

According to yet another aspect of the present invention, the correction value determining unit determines a first damping force correction value according to the second damping force base value and a second damping force correction value according to the spring force estimated by the spring force estimating unit, the target damping force determining unit modifying the target damping force by adding the first damping force correction value to and subtracting the second damping force correction value from the target damping force selected by the target damping force selecting unit. Thereby, the absolute value of the target damping force is reduced when the vehicle body is subjected to an up and down movement owing to the irregularities of the road surface so that the ride quality may be improved. Also, as the spring member extends and retracts in dependence on the changes in the attitude of the vehicle body, the resulting changes in the spring force causes corresponding changes in the target damping force so that both the ride quality and motion stability may be ensured.

According to yet another aspect of the present invention, the second dynamic state variable comprises a vertical movement of a part associated with each wheel, and the correction value determining unit determines a damping force correction value according to vertical movements of parts of the vehicle body located on either side of a horizontal axial line around which the vehicle body is turning.

Thus, when the vehicle is turning (rolling or pitching) around a horizontal axial line, because the average of the vertical displacements of the vehicle body parts on either side of the axial line is zero, an abrupt or excessive change of the attitude of the vehicle body owing to an inadequate damping force can be avoided.

The part associated with each wheel may be located on a part of the vehicle body adjacent to the corresponding wheel or on the wheel itself. However, it is more preferable to detect and use the vertical movement of the wheel itself for the damping force control of the present invention as it involves less delay in control response.

According to yet another aspect of the present invention, the damping force correction value is computed from an average value of vertical movements of the laterally or longitudinally adjacent pair of wheels or vehicle body parts adjacent thereto, and the target damping force determining unit obtains the target damping force by modifying the target damping force base value of each of the pair of wheels by using the damping force correction value.

Thus, for instance, when the vehicle is rolling or pitching around a rolling or pitching axial line, because the average of the vertical accelerations of the laterally arranged pair of wheels or longitudinally arranged pair of wheels is zero, the change in the roll speed or pitch speed can be reduced owing to an unnecessary reduction in the damping force. Thereby, the motion stability of the vehicle can be improved.

According to yet another aspect of the present invention, the method for controlling a variable damper of a wheel suspension system, comprising: detecting a first dynamic state variable of a vehicle body; determining a target damping force base value according to the first dynamic state variable of the vehicle body; detecting a second dynamic state variable of the vehicle body different from the first dynamic state variable; determining a damping force correction value according to the detected second dynamic state variable; and determining a target damping force by modifying the target damping force base value according to the damping force correction value.

BRIEF DESCRIPTION OF THE DRAWINGS

Now the present invention is described in the following with reference to the appended drawings, in which:

FIG. 33 is a block diagram of the roll control unit of the fifth embodiment;

DETAILED DESCRIPTION OF THE PREFERRED EMBODIMENTS

Figure 1:
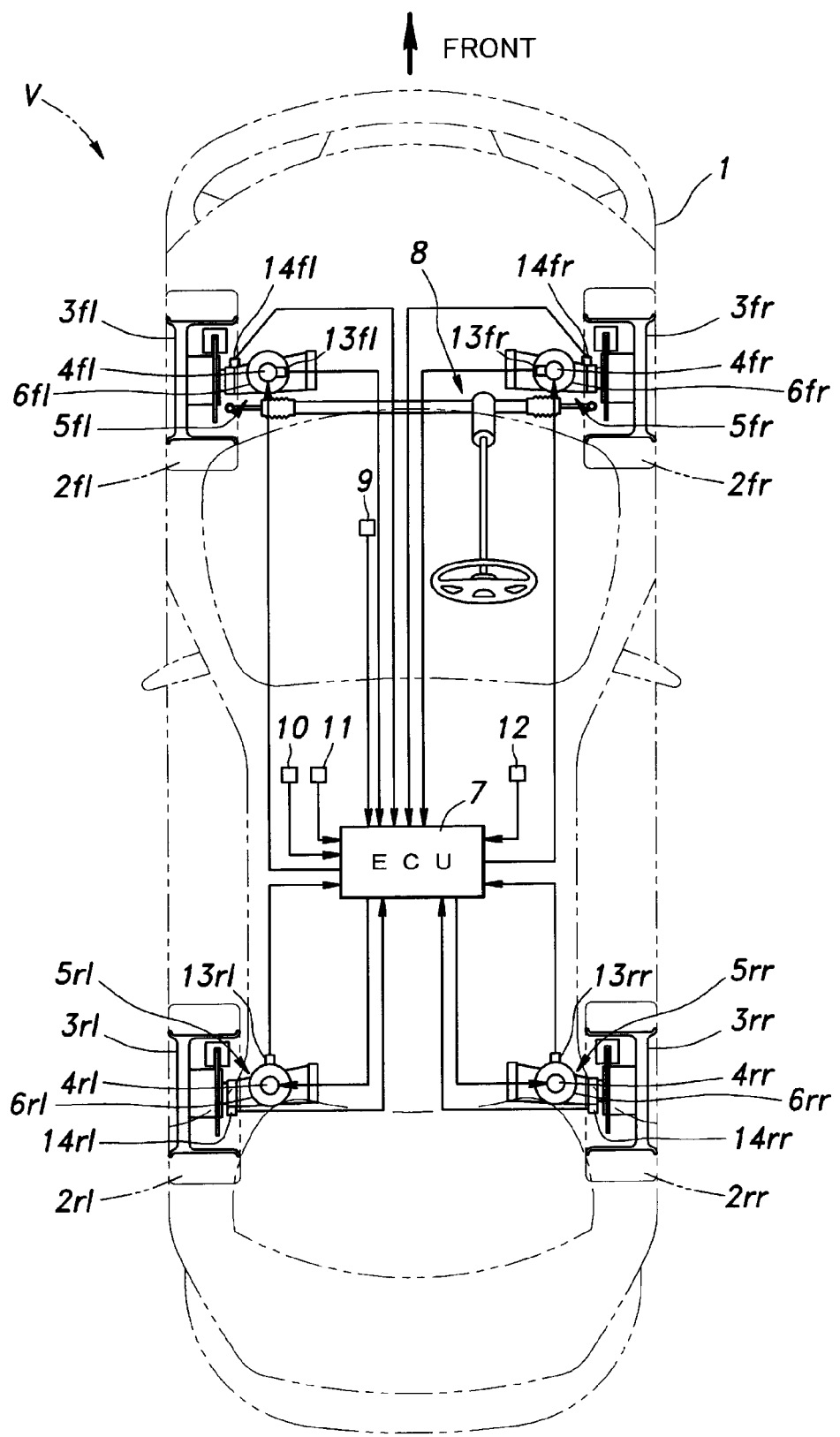
FIG. 1 is a diagram of a four wheel motor vehicle embodying the present invention.
Figure 2:
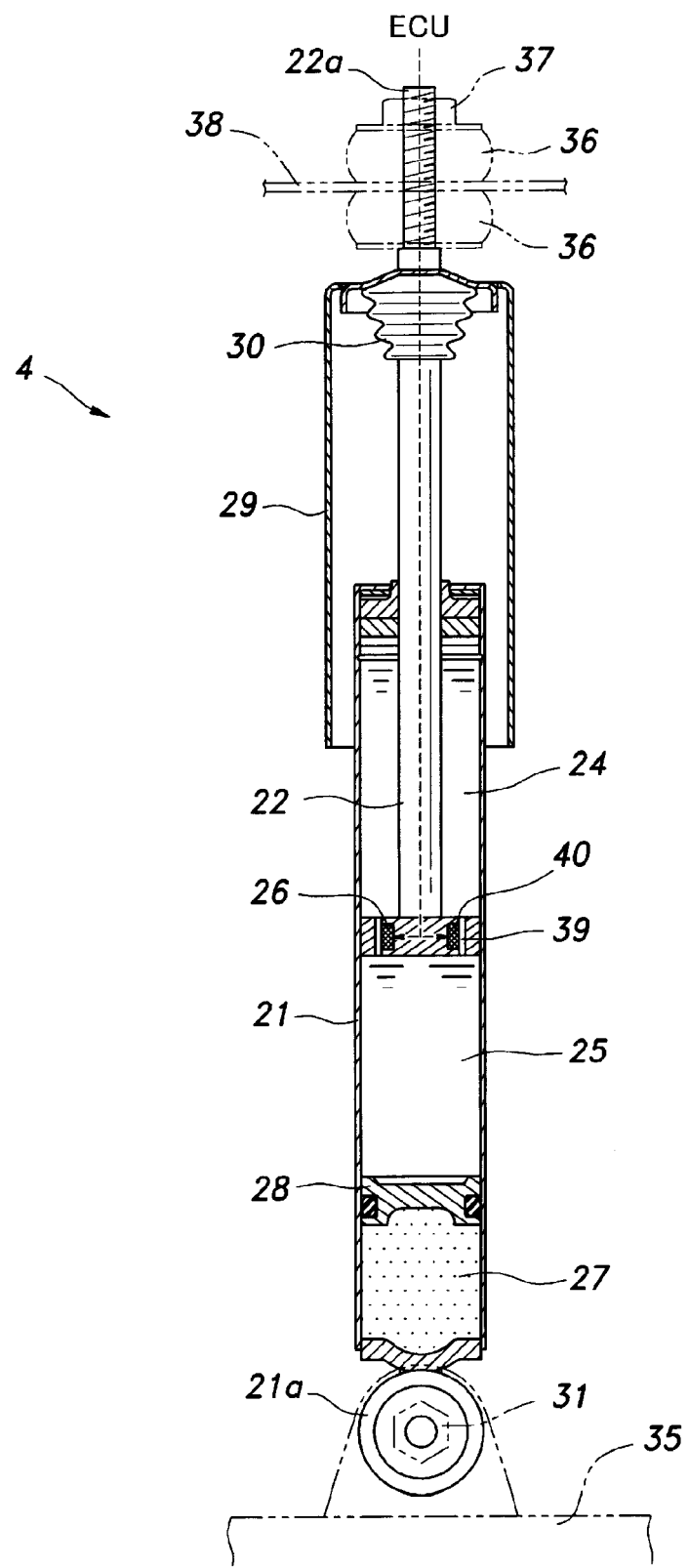
FIG. 2 is a vertical sectional view of a variable damper that can be used in the present invention.
Figure 3:
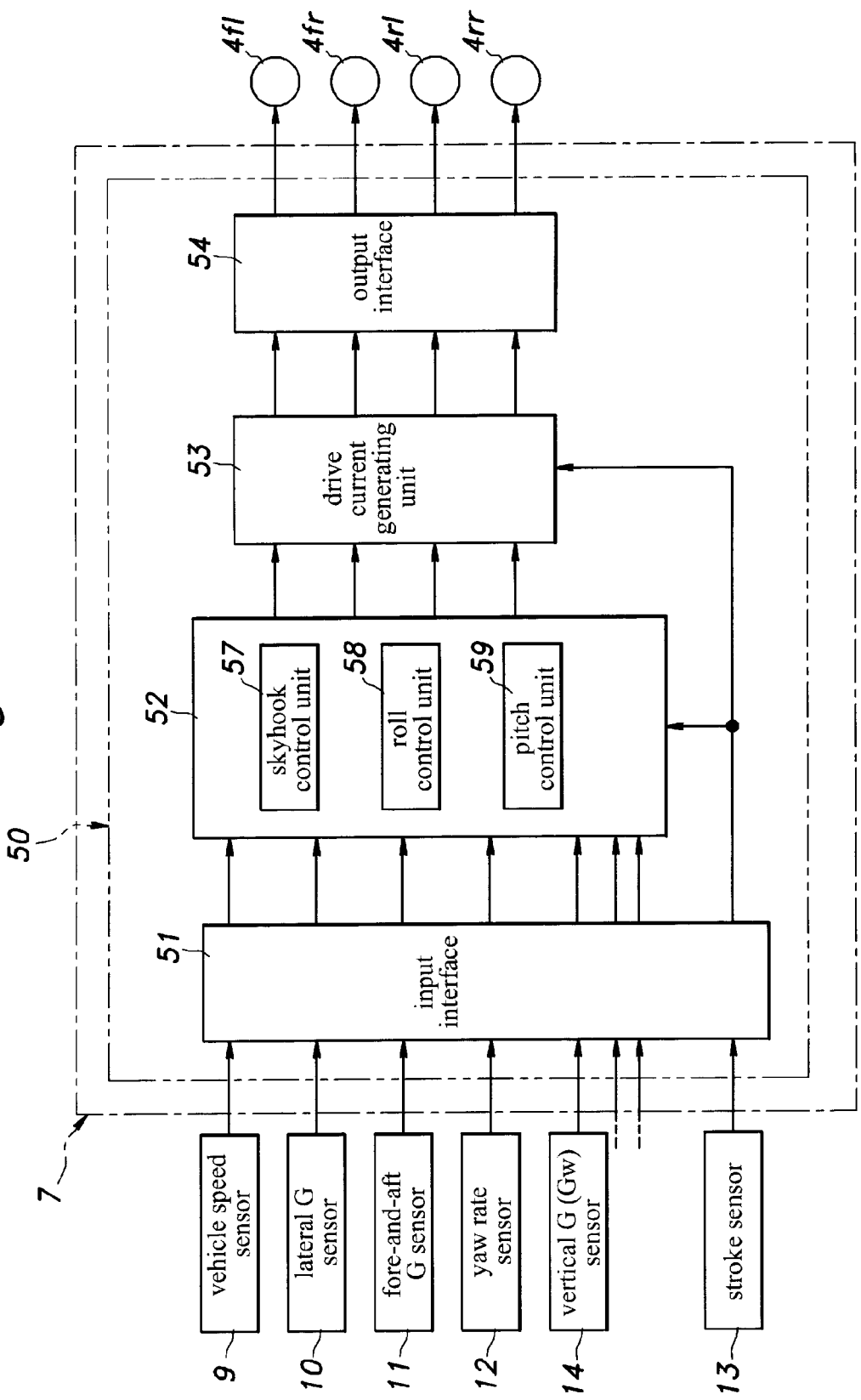
FIG. 3 is a block diagram of a damper control unit of the first embodiment of the present invention.

FIG. 1 is a simplified diagram of a passenger vehicle to which the present invention is applied, FIG. 2 is a vertical sectional view of the damper to which the present invention is applied, and FIG. 3 is a block diagram showing the general structure of the damper control unit embodying the present invention.

Referring to FIG. 1, the illustrated vehicle comprises four wheels 3 which are denoted with numerals 3fl, 3fr, 3rl and 3rr, the suffixes indicating the four different positions of the wheels while numeral 3 denoting the wheels. The components associated with each wheel are similarly denoted by using the same notation system.

The vehicle V thus includes four wheels 3 each fitted with a pneumatic tire 2, and each wheel 3 is supported by the vehicle body 1 via a corresponding suspension system 5 including suspension arms, a spring 6, a MRF damper 4 and other components. The vehicle V additionally comprises a ECU (electronic control unit) 7 for controlling the suspension systems, an EPS (electric power steering system) 8 and a vehicle speed sensor 9. The vehicle V is also provided with various vehicle motion sensors including a lateral G sensor 10, a fore-and-aft G sensor 1 land a yaw rate sensor 12 provided in suitable parts of the vehicle body, and a damper stroke sensor 13 and a wheel vertical G (Gw) sensor 14 provided for each wheel 3. The wheel vertical G sensor 14 may be mounted on a member that moves vertically in association with the vertical movement of the corresponding wheel 3, and, for instance, may be attached to a part of an outboard end of one of the suspension arms or the knuckle.

The ECU 7 comprises a microcomputer, ROM, RAM, a peripheral circuit, an input/output interface and various drivers, and is connected to the dampers 4 and the various sensors 10 to 14 via a communication line such as CAN (controller area network).

As shown in FIG. 2, each damper 4 of the illustrated embodiment consists of a mono-tube type shock absorber comprising a cylindrical cylinder 21 filled with MRF, a piston rod 22 extending out of the cylinder 21 in a slidable manner, a piston 26 attached to the inner end of the piston rod 22 and separating the interior of the cylinder 21 into an upper chamber 24 and a lower chamber 25, a free piston 28 defining a high pressure gas chamber 27 in a lower part of the cylinder 21, a cylindrical cover 29 having a larger inner diameter than the outer diameter of the cylinder 21 and attached to the piston rod 22 in a coaxial relationship to protect the piston rod 22 from contamination, and a bump stopper 30 attached to the piston rod 22 to define the limit of the movement of the damper 6 at the time of full bound in a resilient manner.

The lower end of the cylinder 21 is connected to a bracket formed in the upper surface of a corresponding trailing arm 35 via a bolt 21 passed through the bracket and an eyepiece 21 a formed in the lower end of the cylinder 21. The upper end of the piston rod 22 is provided with a threaded portion 22a which is connected to a damper base 38 (formed in an upper part of a wheel house) via a pair of rubber bushes 22 interposing a damper base member and a nut 37 threaded onto the threaded portion 22a of the piston rod 22.

The piston 26 is provided with an annular passage 39 communicating the upper chamber 24 and the lower chamber 25 with each other and an MLV coil 40 provided immediately radially inwardly of the annular passage 39. When electric current is supplied to the MLV coil 40 by the ECU 7, the MRF flowing through the annular passage 39 is subjected to a magnetic field which forms clusters of the chains of magnetic particles in the MRF and increases the apparent viscosity of the MRF flowing through the annular passage 39.

A damper control unit 50 is incorporated in the ECU 7 as illustrated in FIG. 3. The damper control unit 50 comprises an input interface 51 to which the sensors 10 to 14 are connected, a damping force determining unit 52 for determining the target damping force of each damper 4 according to the detection signals obtained from the sensors 10 to 14, a drive current generating unit 53 for generating the drive current for each damper 4 (MLV coil 40) according the corresponding target damping force supplied by the damping force determining unit 52 and the detection signal from the corresponding stroke sensor 13 and an output interface 54 for supplying the drive current generated by the drive current generating unit 53 to each damper 4. The damping force determining unit 52 comprises a skyhook control unit 57 for performing a skyhook control, a roll control unit 58 for performing a roll control, a pitch control unit 59 for performing a pitch control, and other control units.

Figure 4:
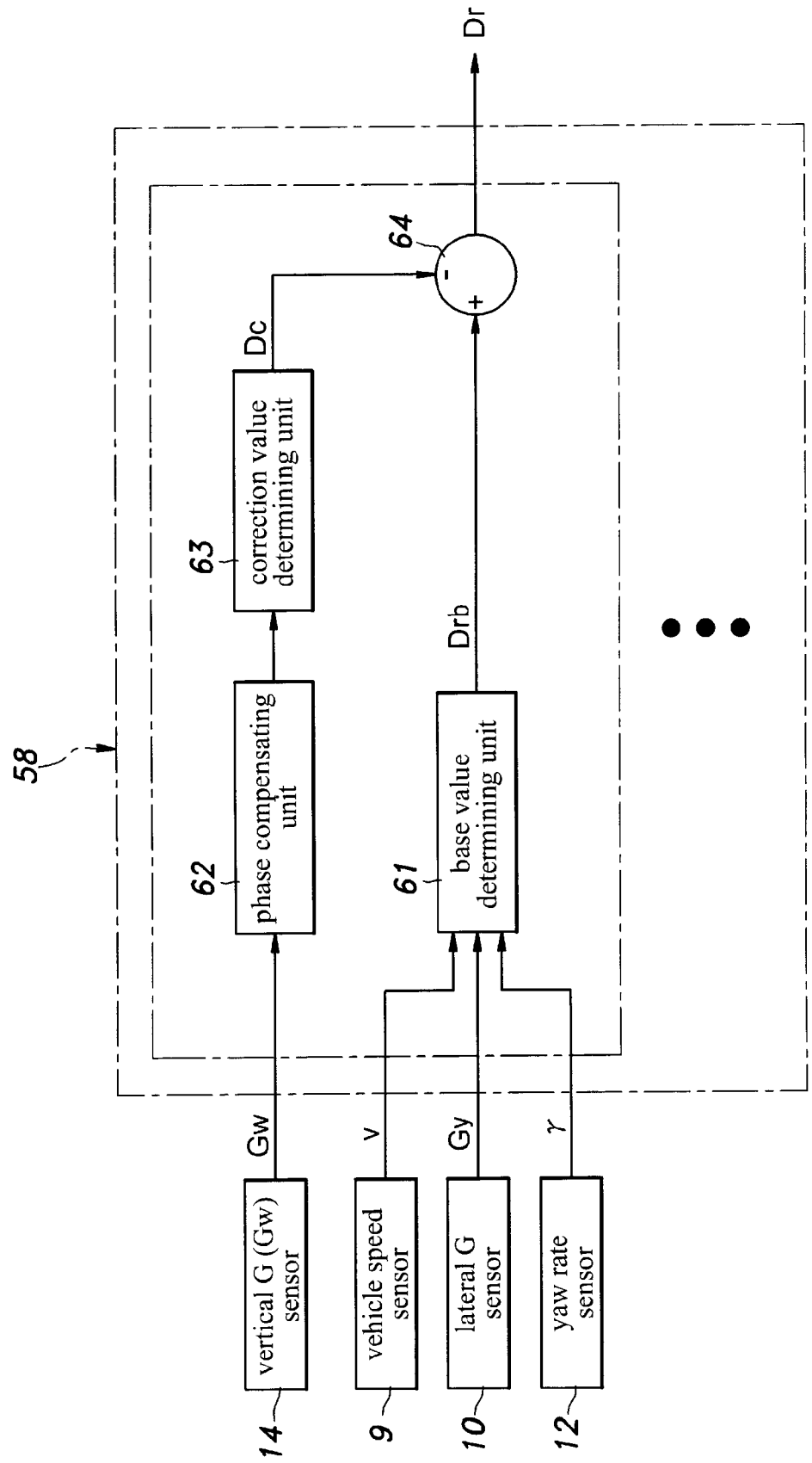
FIG. 4 is a block diagram of the roll control unit of the first embodiment.

Referring to FIG. 4, the roll control unit 58 comprises, for each wheel 3, a base value determining unit 61 for determining a target damping force base value Drb according to a vehicle speed v obtained from the vehicle speed sensor 9, a lateral acceleration Gy obtained from the lateral G sensor 10 and a yaw rate y obtained from the yaw rate sensor 12, a phase compensating unit 62 for performing a phase compensation on a vertical acceleration Gw obtained from the vertical G (Gw) sensor 14, a correction value determining unit 63 for determining a damping force correction value Dc according to the phase compensated vertical acceleration Gw, and a target damping force computing unit 64 for computing a roll control target value Dr by subtracting the damping force correction value Dc from the target camping force base value Drb. The correction value determining unit 63 includes a gain multiplying unit for multiplying a prescribed control gain to the phase compensated vertical acceleration Gw.

Figure 5:
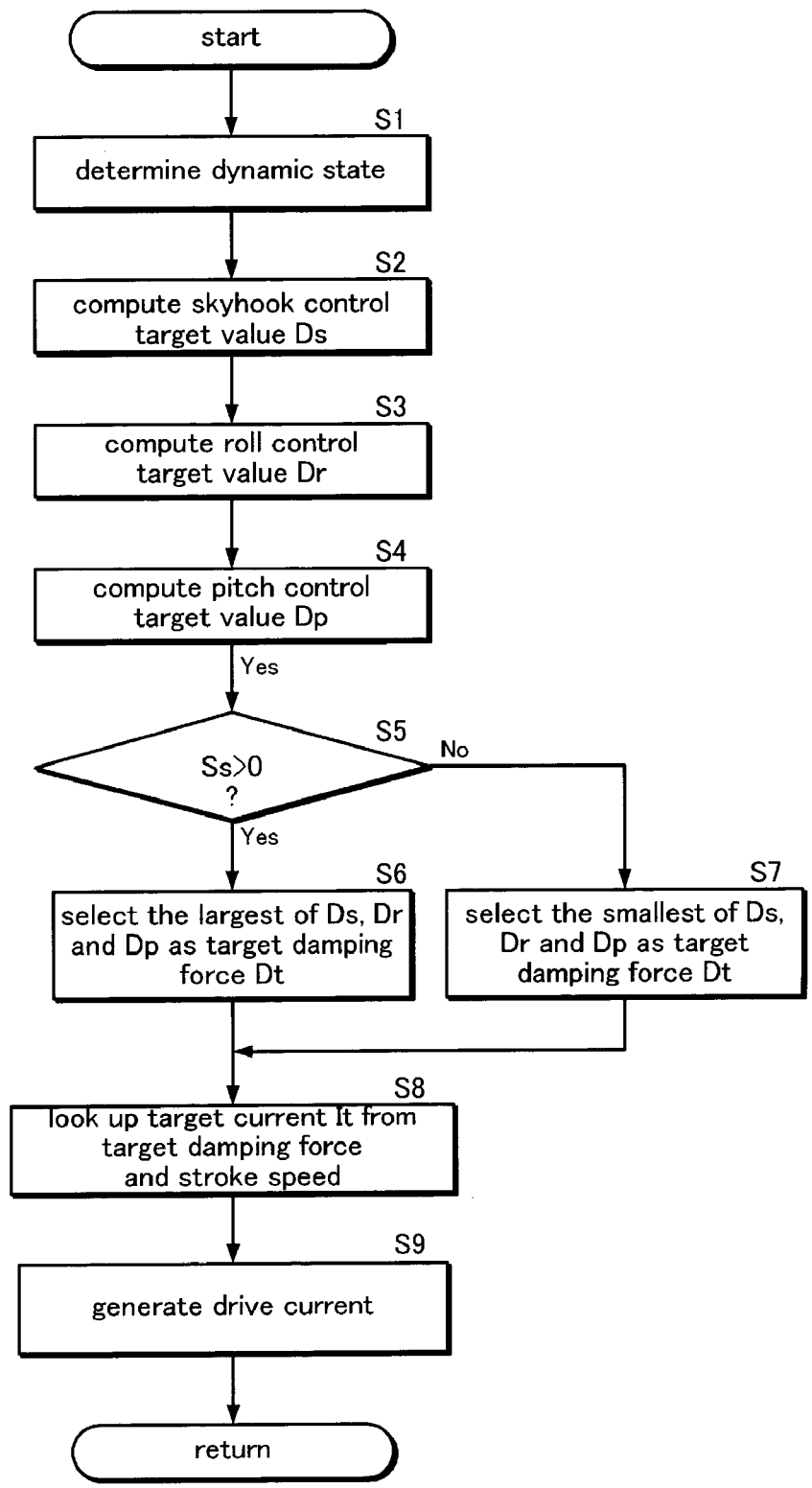
FIG. 5 is a flowchart of the damper control process of the first embodiment.

When the vehicle V is traveling, the damper control unit 50 performs a damping control represented by the flowchart of FIG. 5 at a prescribed processing interval such as 2 msec. First of all, the dynamic state of the vehicle V is determined according to the acceleration of the vehicle V obtained by lateral G sensor 10, fore-and-aft G sensor 11 and vertical G sensors 14, the vehicle speed obtained by the vehicle speed sensor 9 and a steering speed obtained by the steering angle sensor (not shown in the drawing) in step S1. From the dynamic state of the vehicle V, a skyhook control target value Ds for each damper 4 is computed in step S2, a roll control target value Dr for each damper 4 is computed in step S3, and a pitch control target value Dp is computed for each damper 4 in step S4.

The damper control unit 50 then determines if the stroke speed Ss of each damper 4 is positive in step S5. If the stroke speed Ss is positive in value (or the damper 4 is extending), the largest value of the three control target values Ds, Dr and Dp is selected as the target damping force Dt in step S6. If the stroke speed Ss is negative in value (or the damper 4 is contracting), the smallest value of the three control target values Ds, Dr and Dp is selected as the target damping force Dt in step S7.

Figure 6:
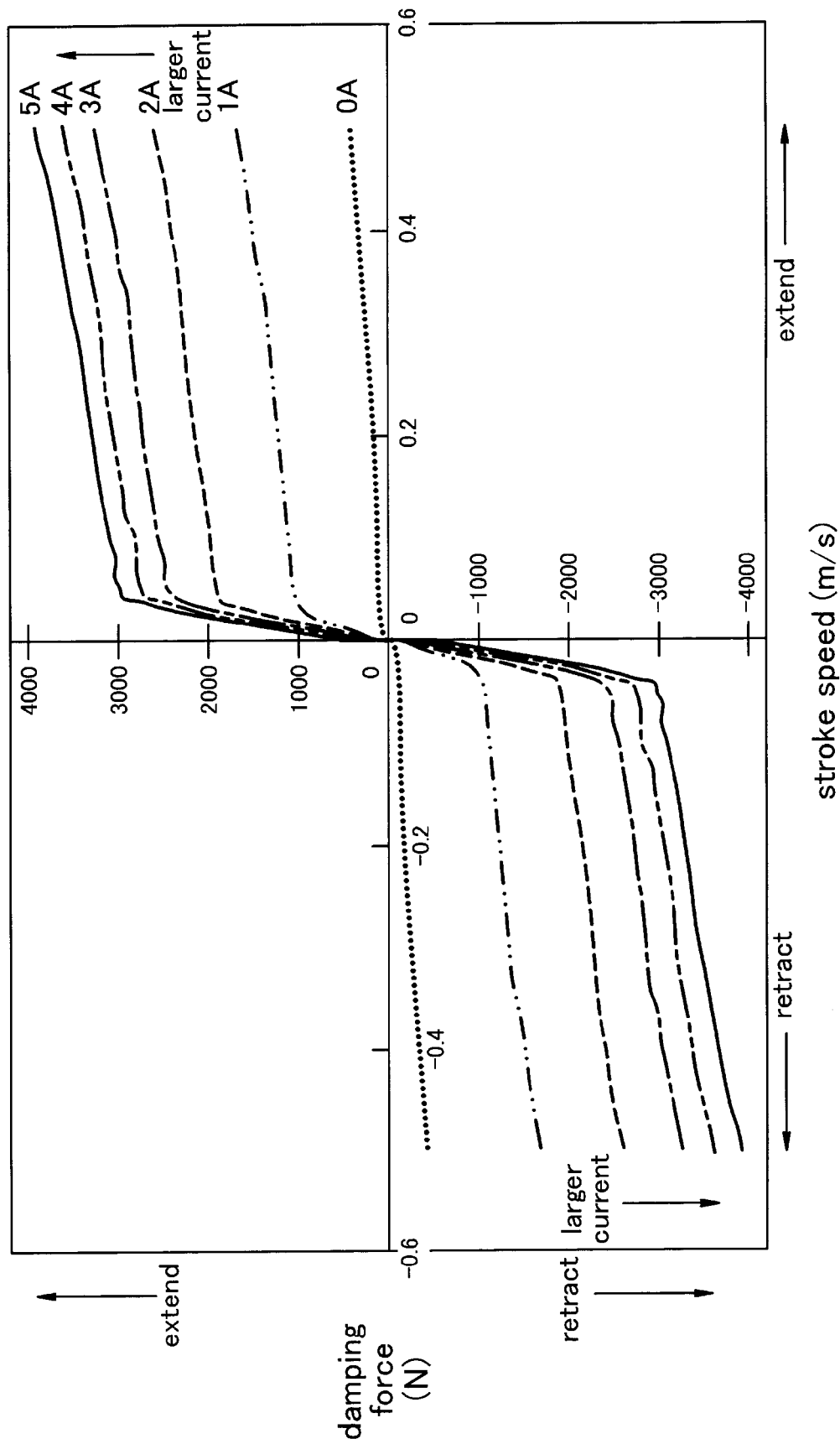
FIG. 6 is a graph showing a relationship between the stroke speed, damping force and electric current supplied to the MLV coil of the damper.

Once the target damping force Dt is determined step S6 or S7, the damper control unit 50 looks up a target current It corresponding to the target damping force Dt from a target current map as presented in the graph of FIG. 6 in step S8. In step S9, the damper control unit 50 then supplies a drive current to the MLV coil 40 of each damper 4 according to the target current It determined in step S8 The roll control unit 58 computes a roll control target value Dr as described in the following. After the base value determining unit 61 has determined a target damping force base value Drb according to the vehicle speed v, lateral acceleration Gy and yaw rate γ, and the phase compensating unit 62 and correction value determining unit 63 have performed the phase compensation and the multiplication of the compensation gain on the vertical acceleration Gw to determine the damping force correction value Dc, the target damping force computing unit 64 computes a roll control target value Dr by subtracting the damping force correction value Dc from the target camping force base value Drb. The pitch control target value Dp and skyhook control target value can be computed in a similar fashion.

Figure 7:
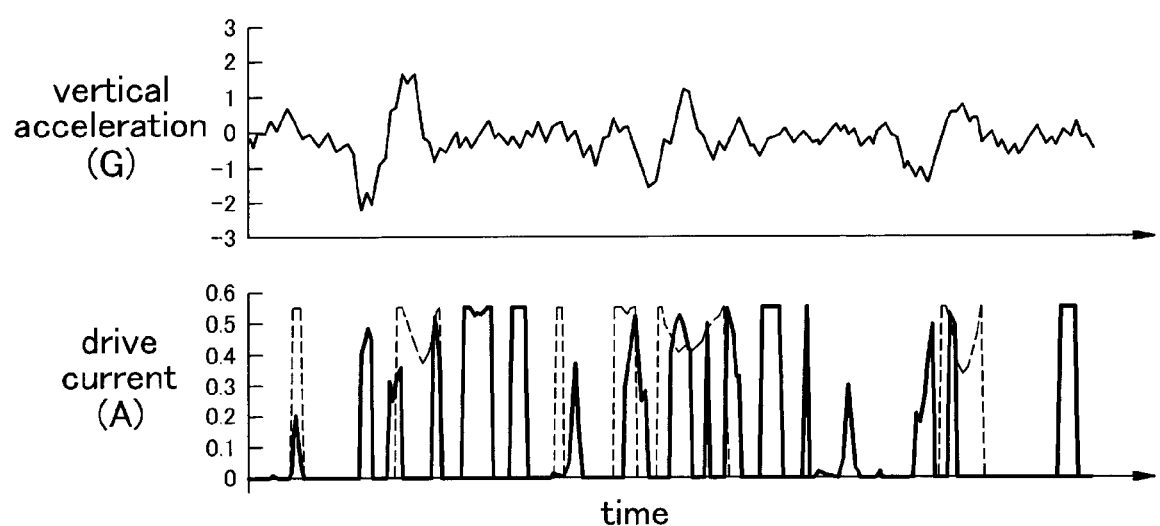
FIG. 7 shows graphs of the vertical acceleration and drive current in relation to time when the vehicle is traveling in a slalom pattern.

FIG. 7 is a graph showing exemplary changes in the drive current as the vehicle makes a slalom or weaving movement. The broken lines indicate the case where the target camping force base value Drb is used as it is for the roll control target value Dr (target damping force Dt), and the solid lines indicate the case where the damping force correction value Dc used in modifying the target camping force base value Drb (the illustrated embodiment of the present invention) when obtaining the roll control target value Dr (target damping force Dt). This situation corresponds to a case where the vehicle makes relatively sharp turns on an irregular road surface. As can be appreciated from this graph, even when the differential value of the lateral acceleration is high (or the target damping force base value Drb is large in value) and the damper 4 would otherwise resist the extending and retracting movement thereof under a normal roll control mode, the drive current is adjusted so that the tossing movement of the wheel owing to an irregular road surface may be prevented from being transmitted to the vehicle body (by reducing the damping force), and the ride quality of the vehicle at such a time is improved.

Figure 8:
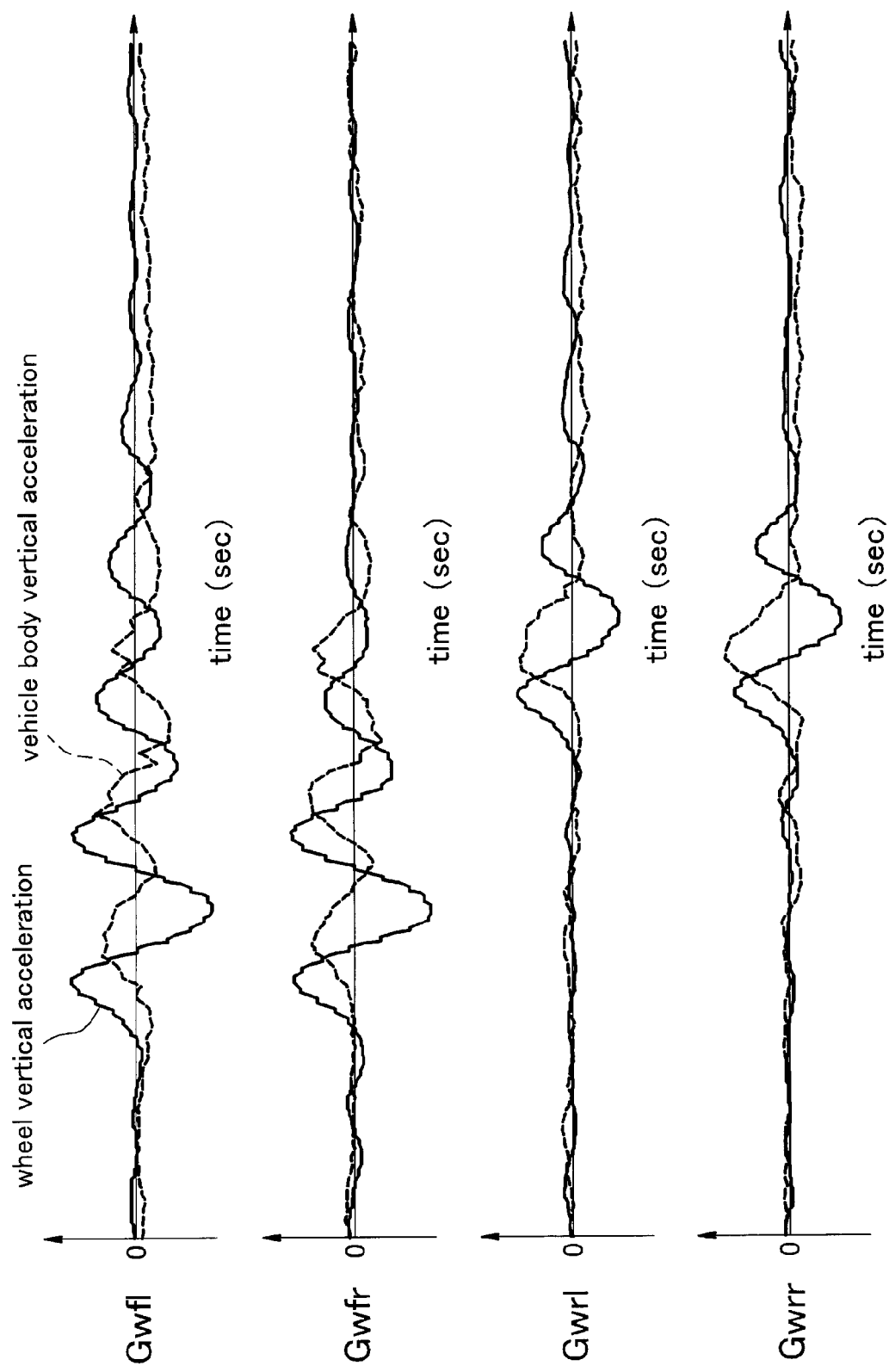
FIG. 8 shows graphs of the vertical accelerations of the wheels and various parts of vehicle bodies in relation with time when the vehicle rides over a bump.

FIG. 8 is a graph showing the changes in the vertical accelerations Gwfl, Gwfr, Gwrl and Gwrr of the four wheels 3fl, 3fr, 3rl and 3rr when a vehicle travels over a bump that extends across the width of the road. The broken lines indicate the case where the control process is based on a vertical acceleration detected by a vehicle body (sprung mass) vertical G sensor mounted on a part of the vehicle body adjacent to each wheel, and the solid lines indicate the case where the control process is based on a vertical acceleration detected by a wheel (unsprung mass) vertical G sensor 14 (the illustrated embodiment of the present invention) mounted on each wheel.

As can be appreciated from the graph of FIG. 8, the vertical acceleration detected by the wheel vertical G sensor 14 is free from a delay as opposed to that detected by the vehicle body vertical G sensor. Therefore, the damper control unit 50 is able to control each damper 4 so as to reduce the damping force when the wheel is tossed up or pushed up by a bump of the road surface. When the vehicle is traveling over a smooth road surfaces, and makes a rolling movement owing to a steering of the vehicle along a curve or makes a pitching movement owing to an acceleration or deceleration of the vehicle, because the wheels do not demonstrate any significant vertical accelerations, the damping force for each wheel is not unduly reduced, and the motion stability of the vehicle is ensured.

The foregoing embodiment was directed to a rolling motion control of a vehicle, but the same principle may be applied to a pitch motion control and a bounce control (when the vehicle travels over a bump of a relatively long wavelength) with a corresponding modification of the embodiment which is obvious for a person skilled in the art.

Figure 9:
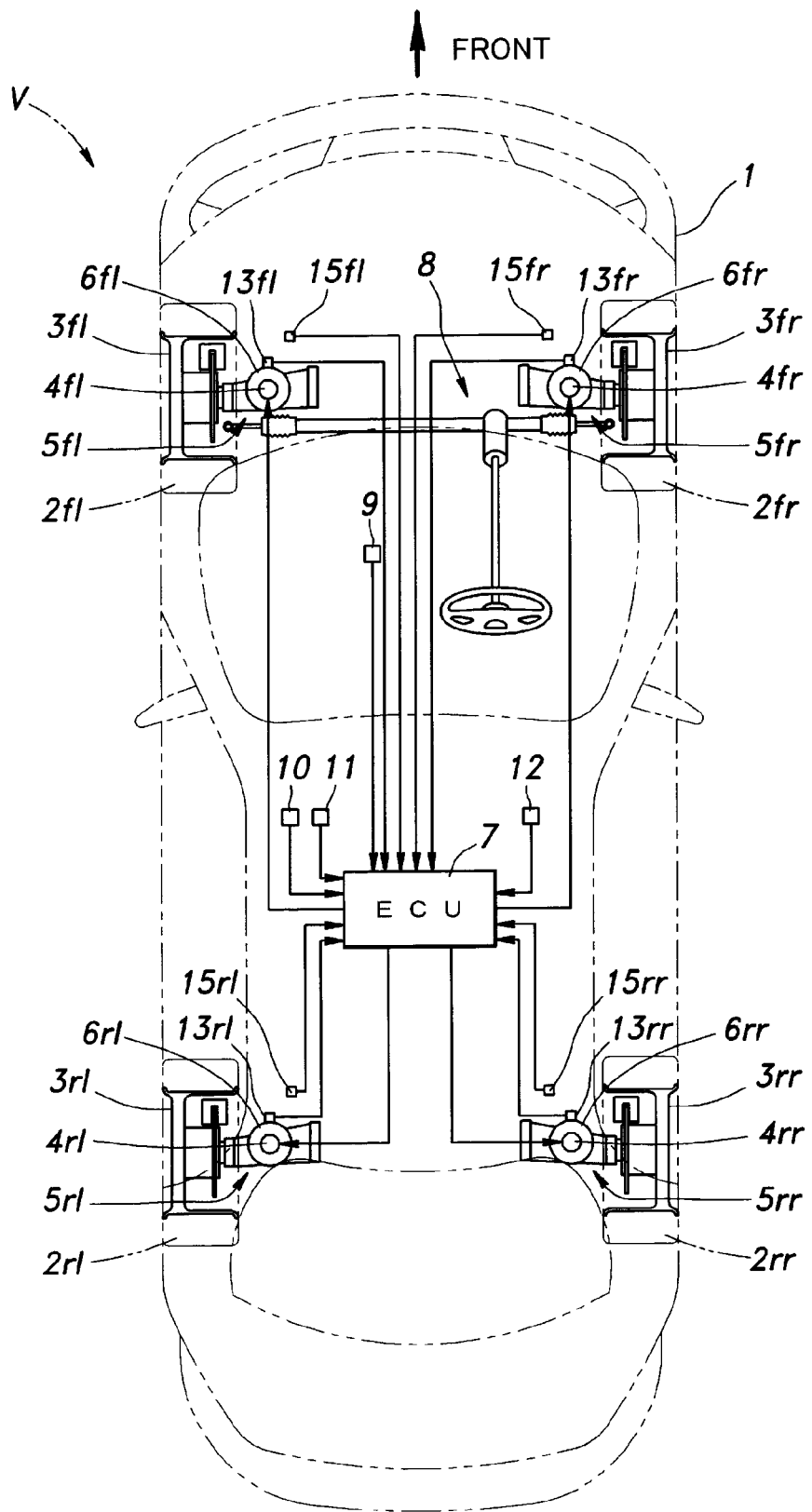
FIG. 9 is a view similar to FIG. 1 showing the second embodiment of the present invention.

A second embodiment of the present invention is described in the following. The second embodiment is similar to the first embodiment with respect to the structure of the damper and the structure of the damper control device, but differs therefrom in the mode of controlling the damping force and the use of a vertical G sensor 15 provided in a wheel house section of the vehicle body adjacent to each wheel 4 as illustrated in FIG. 9. In this embodiment, the parts common to those of the previous embodiment are omitted from the following description to avoid redundancy.

Figure 10:
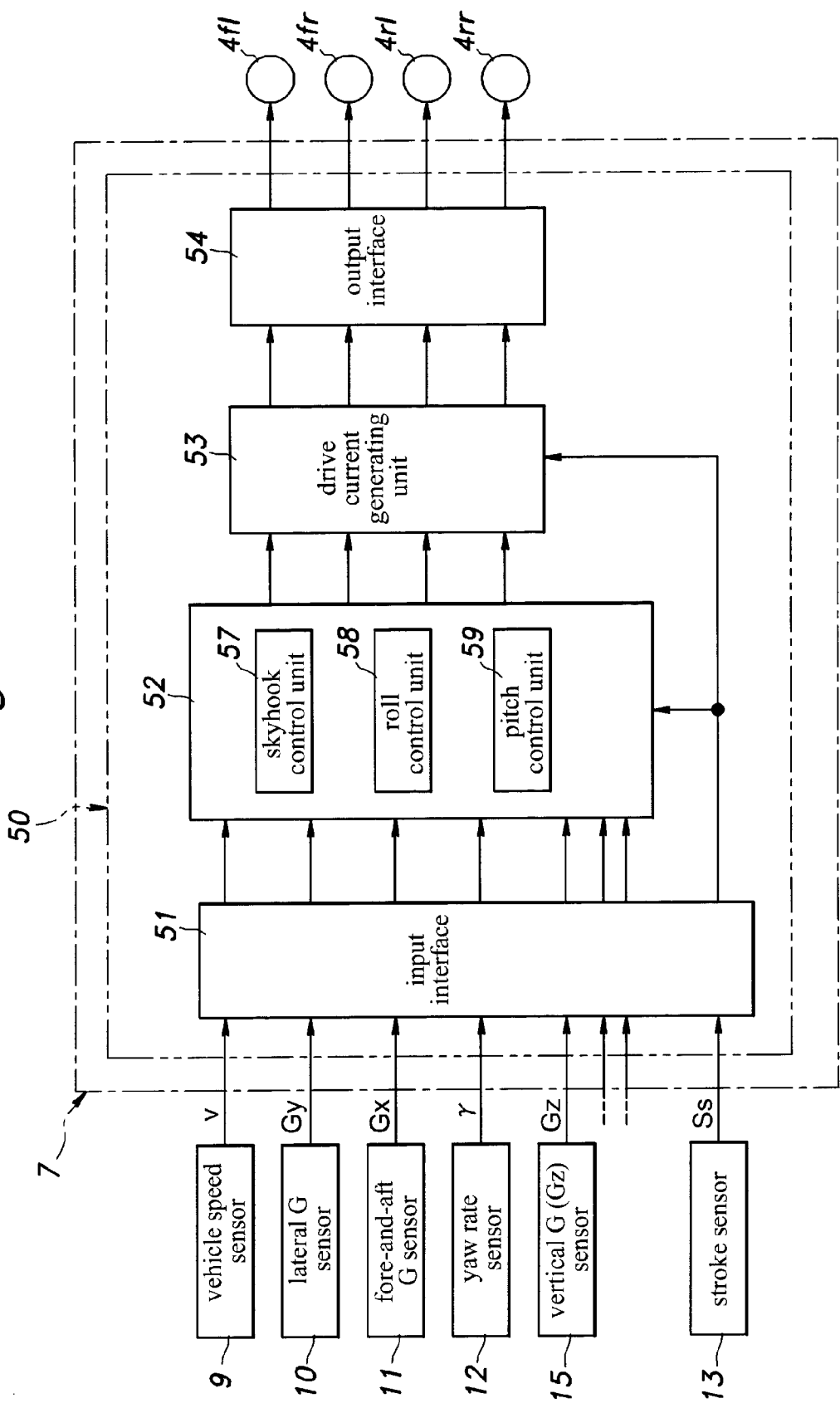
FIG. 10 is a block diagram of a damper control unit of a second embodiment of the present invention.

The damper control unit 50 is similar to that of the previous embodiment, but uses the vertical acceleration obtained from the vehicle body vertical G sensors 15 instead of the wheel vertical G sensors 14 as illustrated in FIG. 10.

Figure 11:
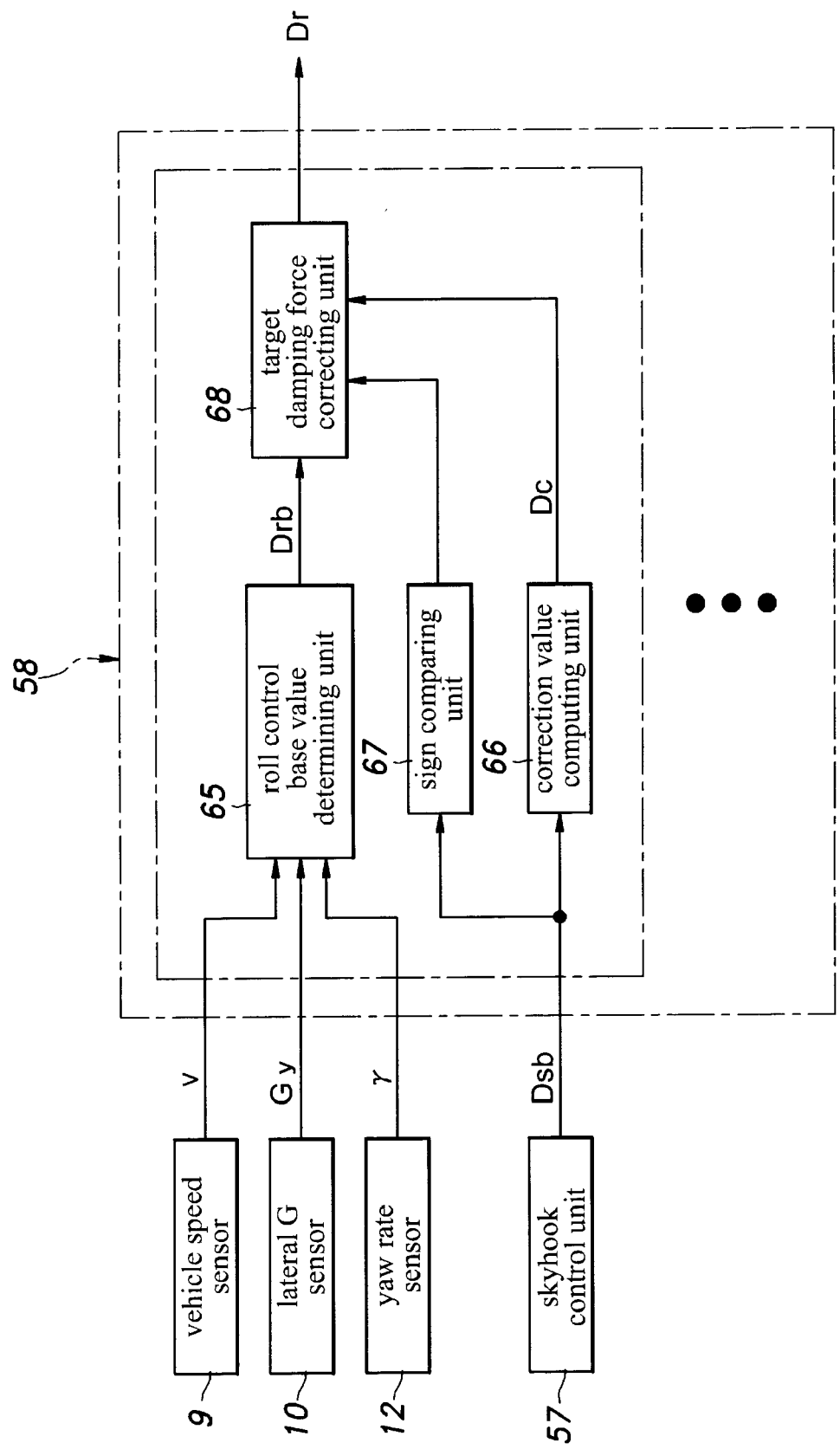
FIG. 11 is a block diagram of the roll control unit of the second embodiment.

As shown in FIG. 11, in this embodiment, for each wheel 3, the roll control unit 58 comprises a roll control base value determining unit 65 for determining a roll control base value Drb according to a vehicle speed signal v received from the vehicle speed sensor 9, a lateral acceleration signal Gy received from the lateral G sensor 10 and a yaw rate signal γ received from the yaw rate sensor 12, a correction value computing unit 66 for computing a damping force correction value Dc by multiplying a prescribed gain G to a skyhook control base value Dsb received from the skyhook control unit 57, a sign comparing unit 67 for comparing the signs of the roll control base value Drb and skyhook control base value Dsb with each other, a target damping force correcting unit 68 for determining a target damping force Dt by performing a correcting process based on the computing result of the correction value computing unit 66 and a comparing result of the sign comparing unit 67 to the roll control base value Drb.

Figure 12:
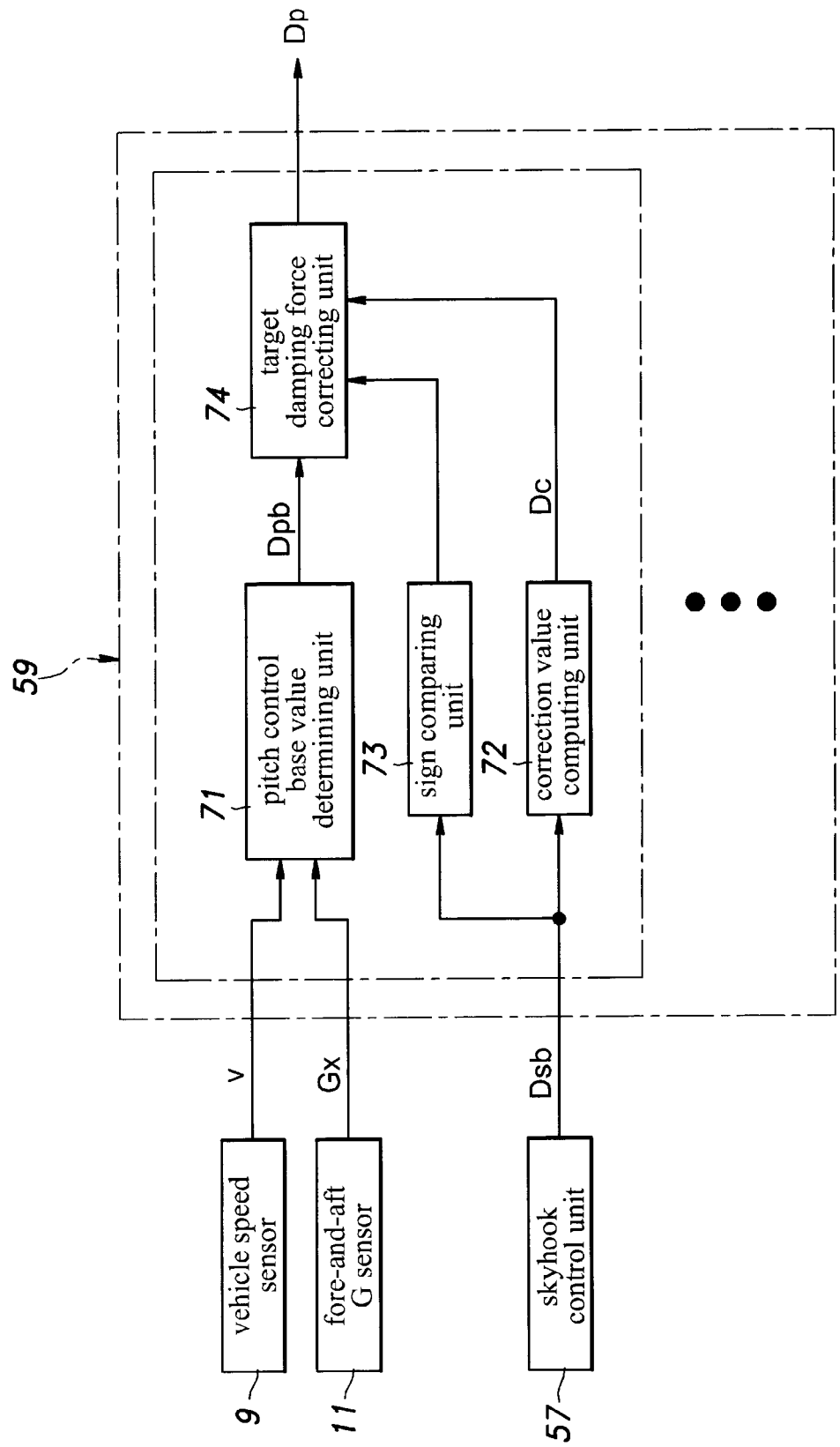
FIG. 12 is a block diagram of the pitch control unit of the second embodiment.

As shown in FIG. 12, in this embodiment, for each wheel 3, the pitch control unit 59 comprises a pitch control base value determining unit 71 for determining a pitch control base value Dpb according to a vehicle speed signal v received from the vehicle speed sensor 9 and a fore-and-aft acceleration signal Gx received from the fore-and-aft G sensor 11, a correction value computing unit 72 for computing a damping force correction value Dc by multiplying a prescribed gain G to a skyhook control base value Dsb received from the skyhook control unit 57, a sign comparing unit 73 for comparing the signs of the pitch control base value Dpb and skyhook control base value Dsb, a target damping force correcting unit 74 for determining a target damping force Dp by performing a correcting process based on the computing result of the correction value computing unit 72 and a comparison result of the sign comparing unit 73 to the pitch control base value Dpb.

Figure 13:
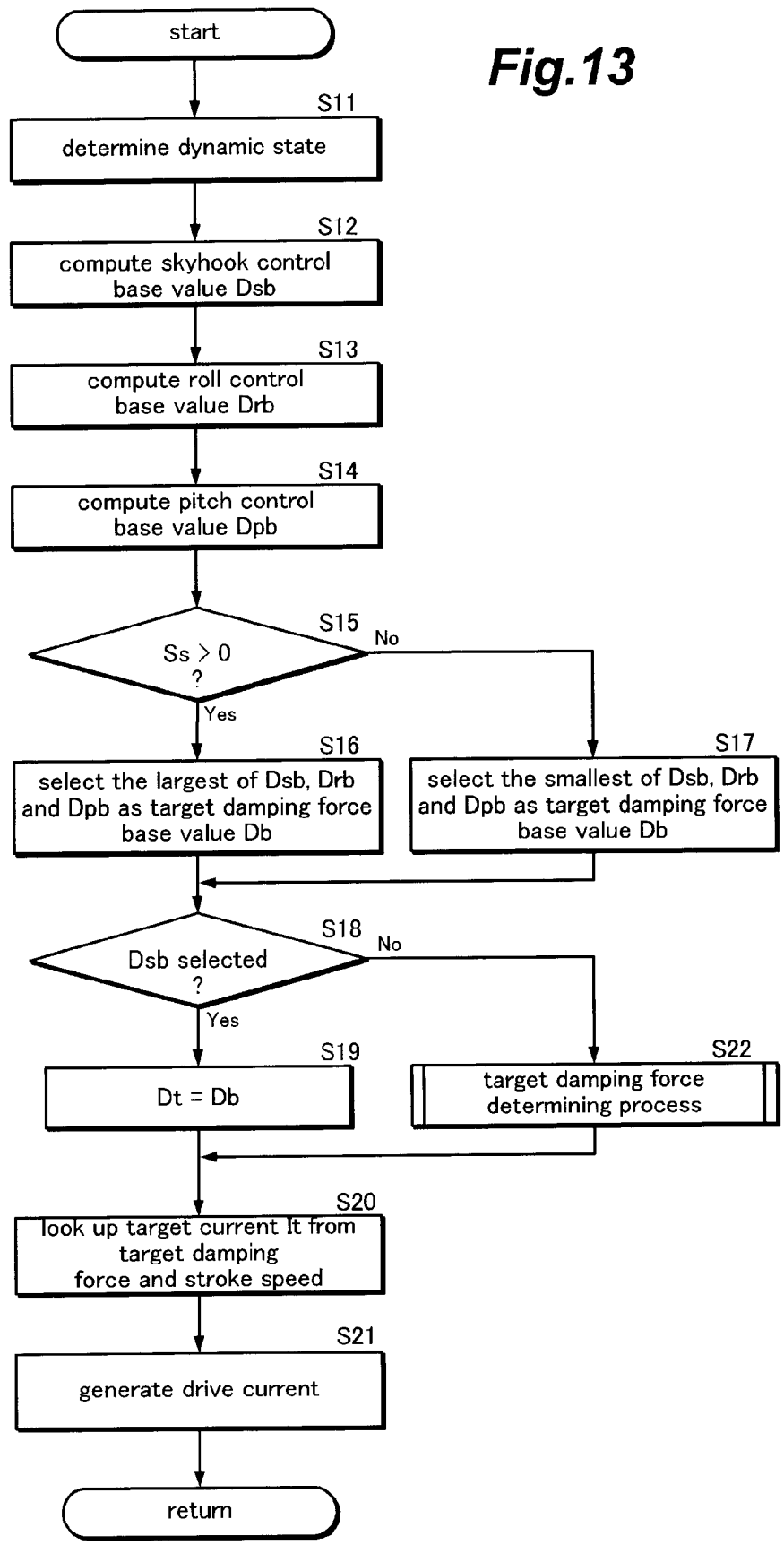
FIG. 13 is a flowchart of the damper control process of the second embodiment.

When the vehicle V is traveling, the damper control unit 50 performs a damping control represented by the flowchart of FIG. 13 at a prescribed processing interval such as 2 msec. First of all, the dynamic state of the vehicle V is determined according to the acceleration of the vehicle V obtained by lateral G sensor 10, fore-and-aft G sensor 11 and vertical G sensors 15, the vehicle speed v obtained by the vehicle speed sensor 9 and a steering speed obtained by the steering angle sensor (not shown in the drawing) in step S11. From the dynamic state of the vehicle V, a skyhook control base value Dsb for each damper 4 is computed in step S12, a roll control base value Drb for each damper 4 is computed in step S13, and a pitch control base value Dpb is computed for each damper 4 in step S14.

It is then determined in step SI 5 if the stroke speed Ss of each damper obtained by differentiating the stroke signal is positive. If the stroke speed Ss is positive (or the damper 4 is extending), the largest of the three control base values Dsb, Drb and Dpb is selected as the target damping force base value Db in step S116. If the stroke speed Ss is negative (or the damper 4 is contracting), the smallest of the three control base values Dsb, Drb and Dpb is selected as the target damping force base value Db in step S17.

It is determined in step S18 if the skyhook control target value Dsb has been selected as the target damping force base value Db. If so, the target damping force base value Db is selected as the target damping force Dt in step S19, and a target current It corresponding to the target damping force Dt is looked up from the target current map illustrated in FIG. 6 in step S20. In step S21, the damper control unit 50 supplies a drive current to the MLV coil 40 of each damper 4 according to the target current It looked up in step S20.

Figure 14:
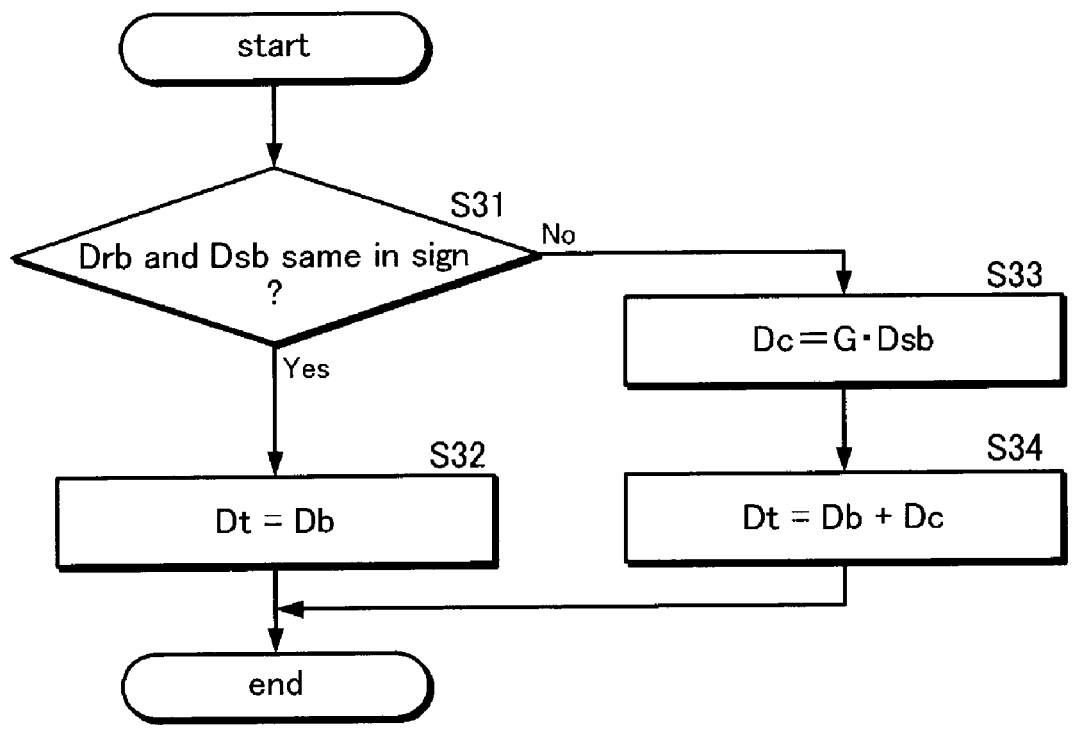
FIG. 14 is a flowchart of the target damping force determining process of the second embodiment.
Figure 15:
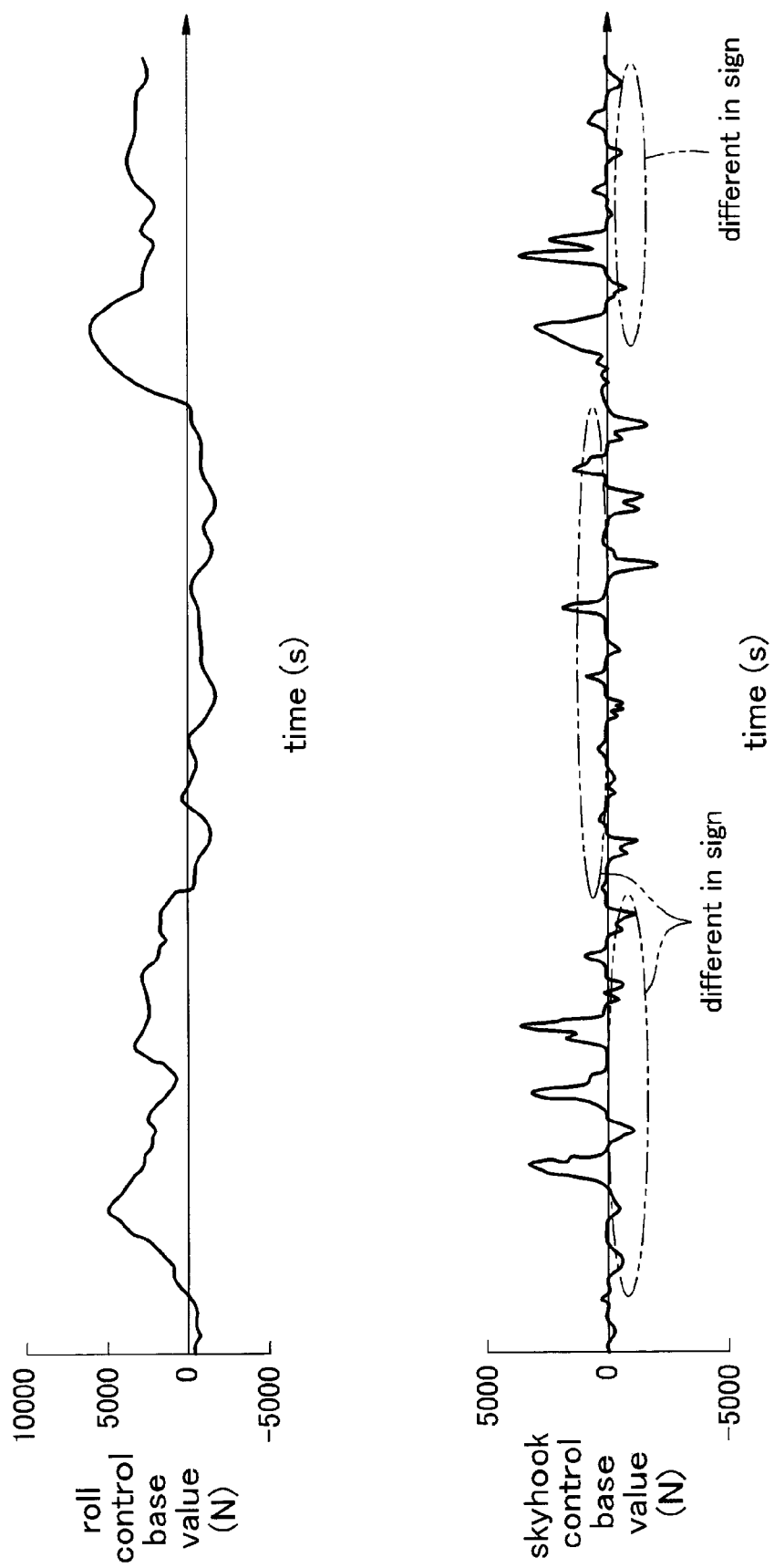
FIG. 15 shows changes in the roll control base value and skyhook control base value with time in the second embodiment.
Figure 16:
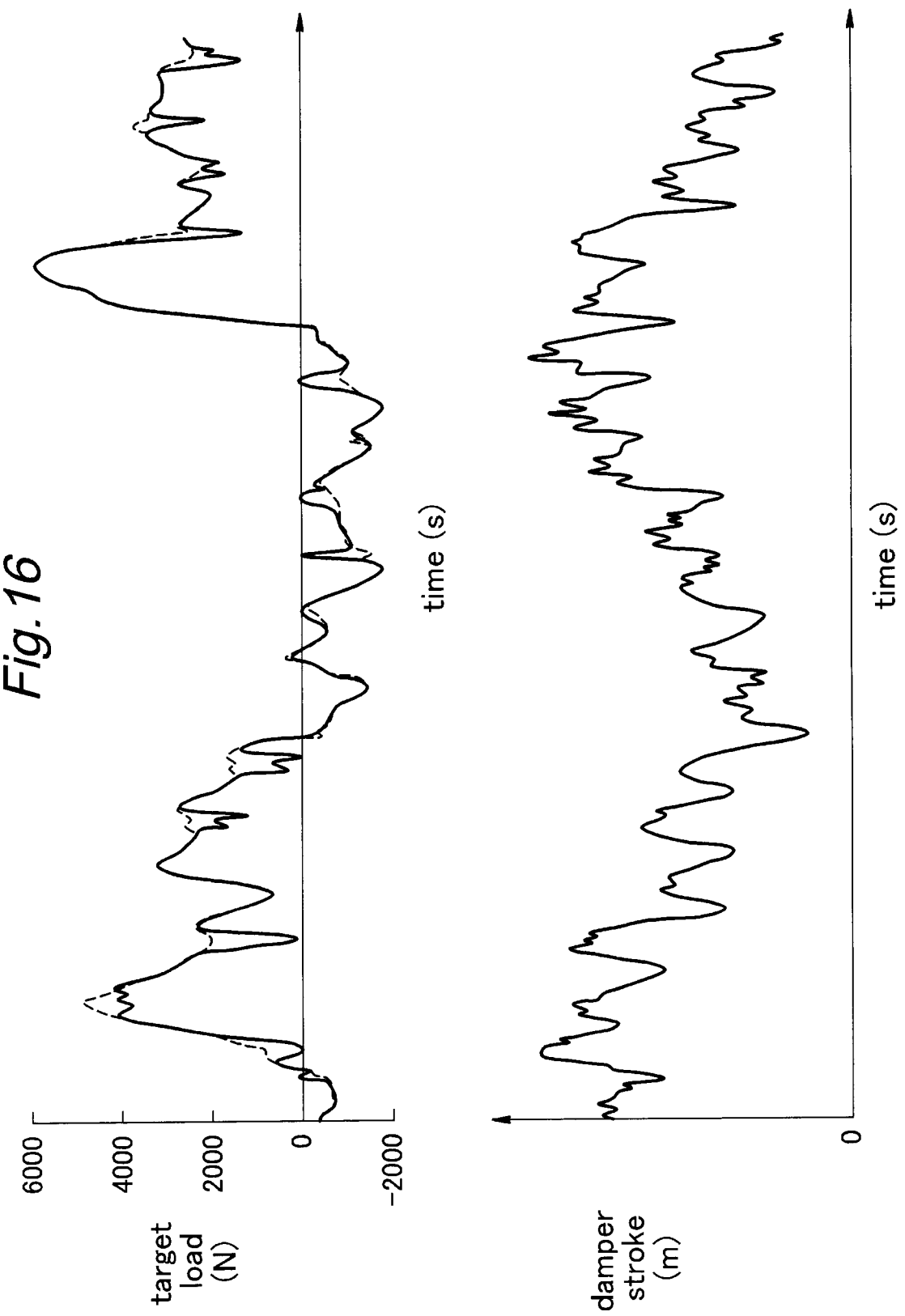
FIG. 16 shows changes in the target control load and damper stroke with time in the second embodiment.

If the skyhook control base value Dsb is not selected such as when the roll control base value Drb is selected for the target damping force base value Db in step S18, a target damping force determining process is executed in step S22. Details of the target damping force determining process is shown in the flowchart of FIG. 14. In the target damping force determining process, it is determined if the roll control base value Drb and skyhook control base value Dsb are the same in sign in step S31. If so, the target damping force base value Db is selected as the target damping force Dt.

If the roll control base value Drb and skyhook control base value Dsb are different in sign from each other in step S31, a damping force correction value Dc is computed by multiplying a gain G to the skyhook control base value Dsb in step S33, and a target damping force Dt is computed by adding the damping force correction value Dc to the target damping force base value Db in step S34. When computing the target damping force Dt, the gain G may be negative in value so that the target damping force Dt is computed, in effect, by subtracting the damping force correction value Dc from the target damping force base value Db.

FIG. 9 shows the changes in the roll control base value Drb and skyhook control base value Dsb. It can be seen that the two control base values Drb and Dsb are opposite in sign in the regions surrounded by double-dot chain-dot lines. Therefore, when a rapid vertical up and down movement is caused by an irregular road surface during a roll control mode, the absolute value of the target control load (target damping force Dt) is reduced as indicated by the solid lines in the graphs of FIG. 10 so that the resistance to the movement of the damper 4 is reduced, and the ride quality is prevented from being impaired. A similar process can be executed when the pitch control base value Dpb is selected for the target damping force base value Db.

Figure 17:
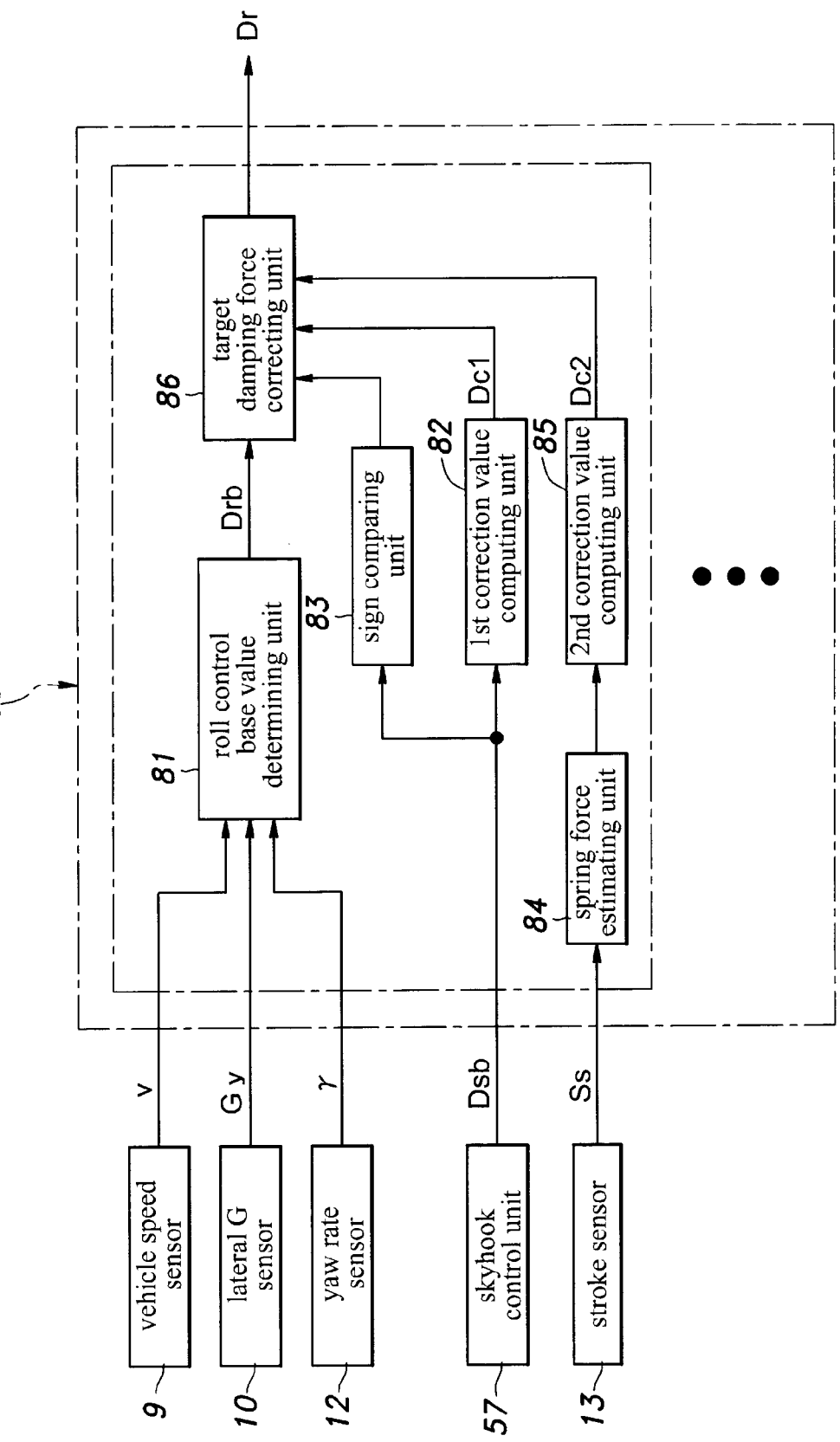
FIG. 17 is a block diagram of the roll control unit of the third embodiment.
Figure 18:
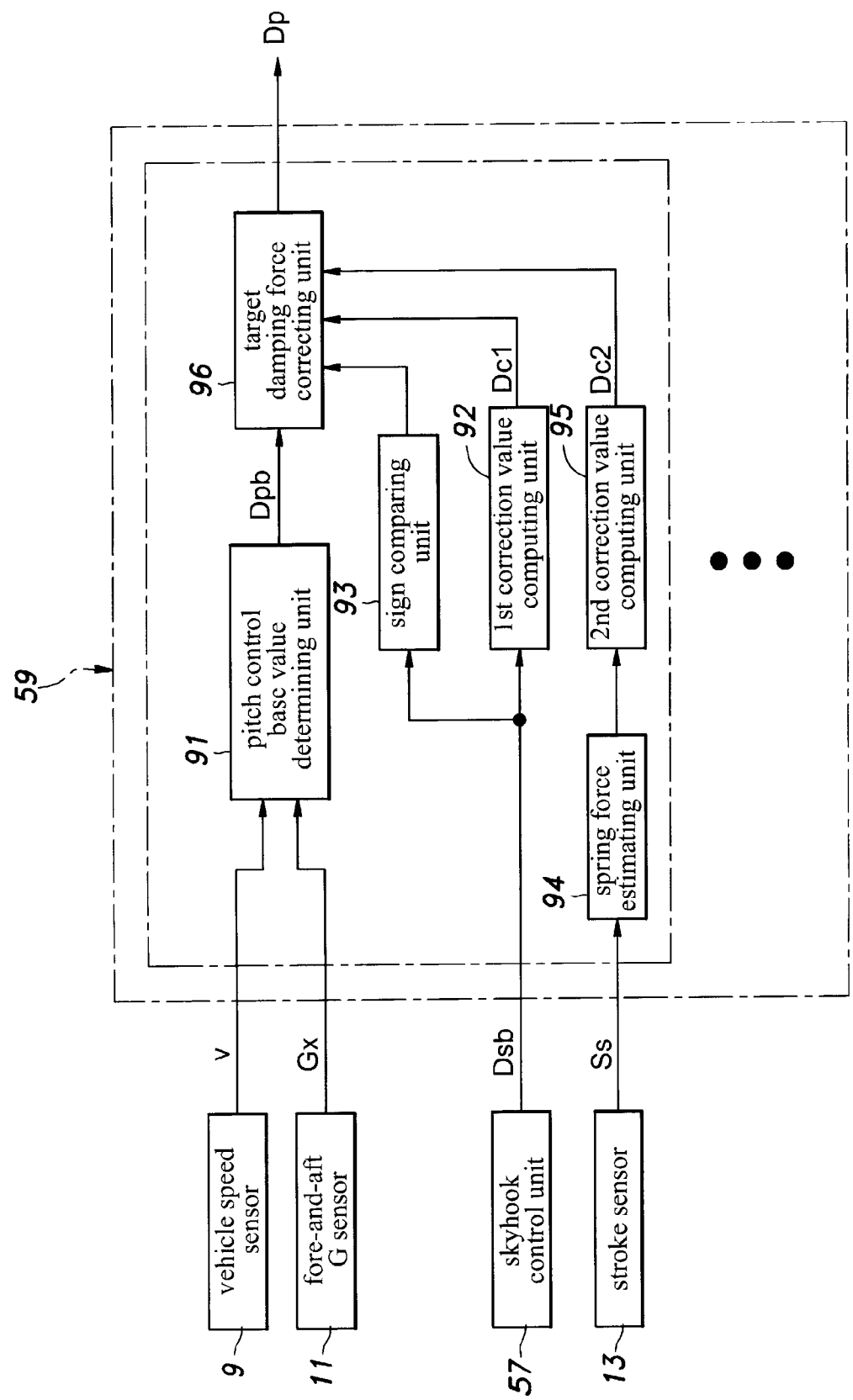
FIG. 18 is a block diagram of the pitch control unit of the third embodiment.

FIGS. 17 and 18 are block diagrams of a roll control unit and a pitch control unit of a third embodiment of the present invention, respectively. The parts corresponding to those of the previous embodiments are denoted with like numerals without repeating the description of such parts.

As shown in FIG. 17, in this embodiment, for each wheel 3, the roll control unit 58 comprises a roll control base value determining unit 81 for determining a roll control base value Drb according to a vehicle speed signal v received from the vehicle speed sensor 9, a lateral acceleration signal Gy received from the lateral G sensor 10 and a yaw rate signal γ received from the yaw rate sensor 12, a first correction value computing unit 82 for computing a first damping force correction value Dc1 by multiplying a prescribed gain G to a skyhook control base value Dsb received from the skyhook control unit 57, a sign comparing unit 83 for comparing the signs of the roll control base value Drb and skyhook control base value Dsb, a spring force estimating unit 84 for estimating the spring force of the spring 6 according to the stroke signal received from the stroke sensor 13, a second correction value computing unit 85 for computing a second damping force correction value Dc2 from the detected spring force or the output of the spring force estimating unit 84 and a target damping force correcting unit 86 for determining a target damping force Dr by performing a correcting or modifying process based on the computing results of the first and second correction value computing units 82 and 85 and a comparison result of the sign comparing unit 83 to the roll control base value Drb.

As shown in FIG. 18, in this embodiment, for each wheel 3, the pitch control unit 59 comprises a pitch control base value determining unit 91 for determining a pitch control base value Dpb according to a vehicle speed signal v received from the vehicle speed sensor 9 and a fore-and-aft acceleration signal Gx received from the fore-and-aft G sensor 11, a first correction value computing unit 92 for computing a first damping force correction value Dc1 by multiplying a prescribed gain G to a skyhook control base value Dsb received from the skyhook control unit 57, a sign comparing unit 93 for comparing the signs of the pitch control base value Dpb and skyhook control base value Dsb, a spring force estimating unit 94 for estimating the spring force of the spring 6 according to a stroke signal received from the stroke sensor 13, a second correction value computing unit 95 for computing a second damping force correction value Dc2 from the detected spring force or the output of the spring force estimating unit 94 and a target damping force correcting unit 96 for determining a target damping force Dp by performing a correcting or modifying process based on the computing results of the first and second correction value computing units 92 and 95 and a comparison result of the sign comparing unit 93 to the pitch control base value Dpb.

Figure 19:
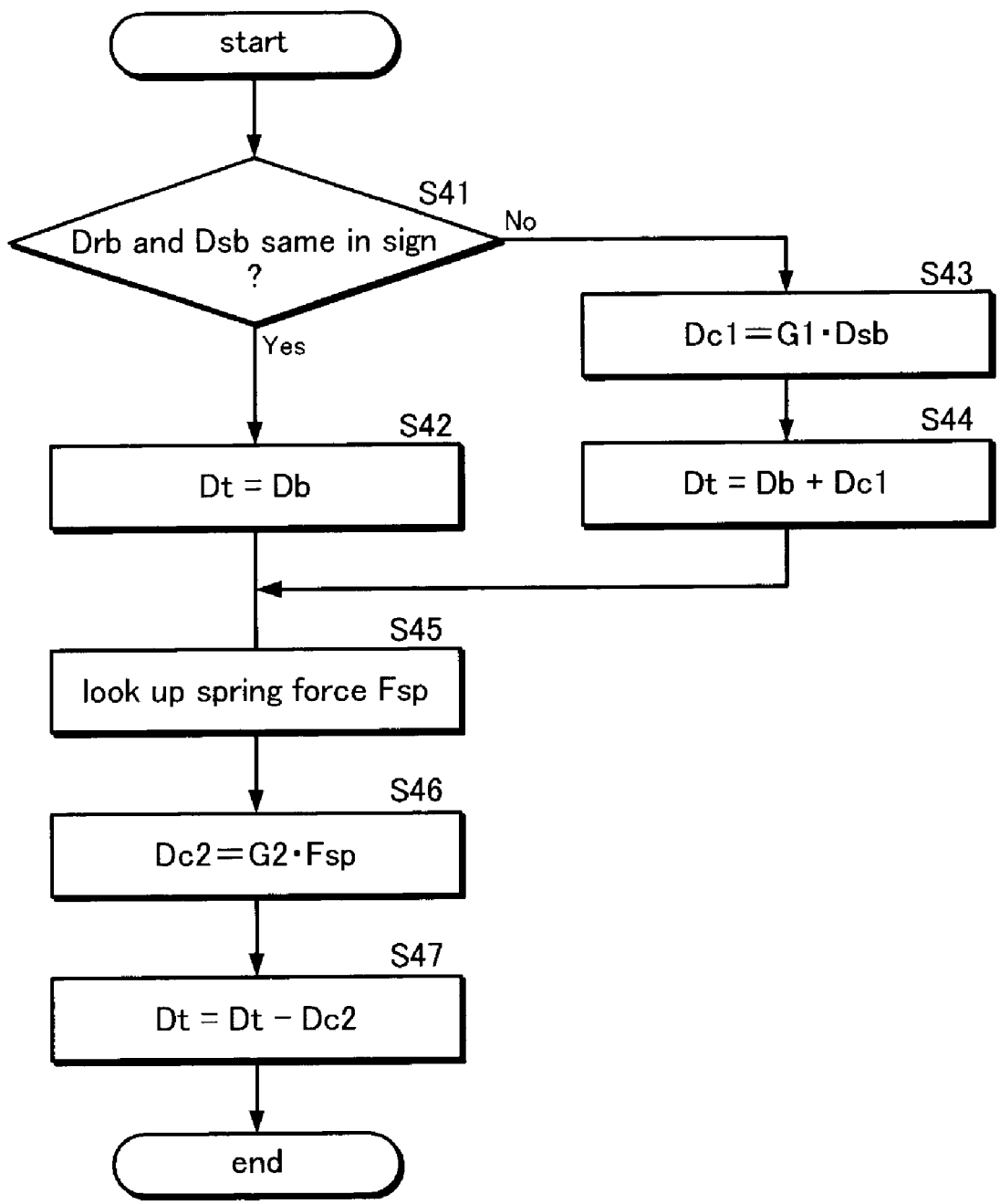
FIG. 19 is a flowchart of the target damping force determining process of the third embodiment.

When the vehicle is traveling, the damper control unit 50 performs a damping control represented by the flowchart of FIG. 13 at a prescribed processing interval such as 2 msec. When the roll control base value Drb is selected for the target damping force base value Dtb in step S18, the target damping force determining process is executed in step S22. Details of the target damping force determining process of the third embodiment is shown in the flowchart of FIG. 19. In the target damping force determining process, it is determined if the roll control base value Drb and skyhook control base value Dsb are the same in sign in step S41. If so, the target damping force base value Db is selected as the target damping force Dt in step S42.

If the roll control base value Drb and skyhook control base value Dsb are different in sign from each other in step S41, a first damping force correction value Dc1 is computed by multiplying a first gain G1 to the skyhook control base value Dsb in step S43, and a target damping force Dt is computed by adding the first damping force correction value Dc1 to the target damping force base value Db in step S44. When computing the target damping force Dt in steps S43 and S44, the gain G1 may be negative in value so that the target damping force Dt is computed, in effect, by subtracting the damping force correction value Dc1 from the target damping force base value Db.

Figure 20:
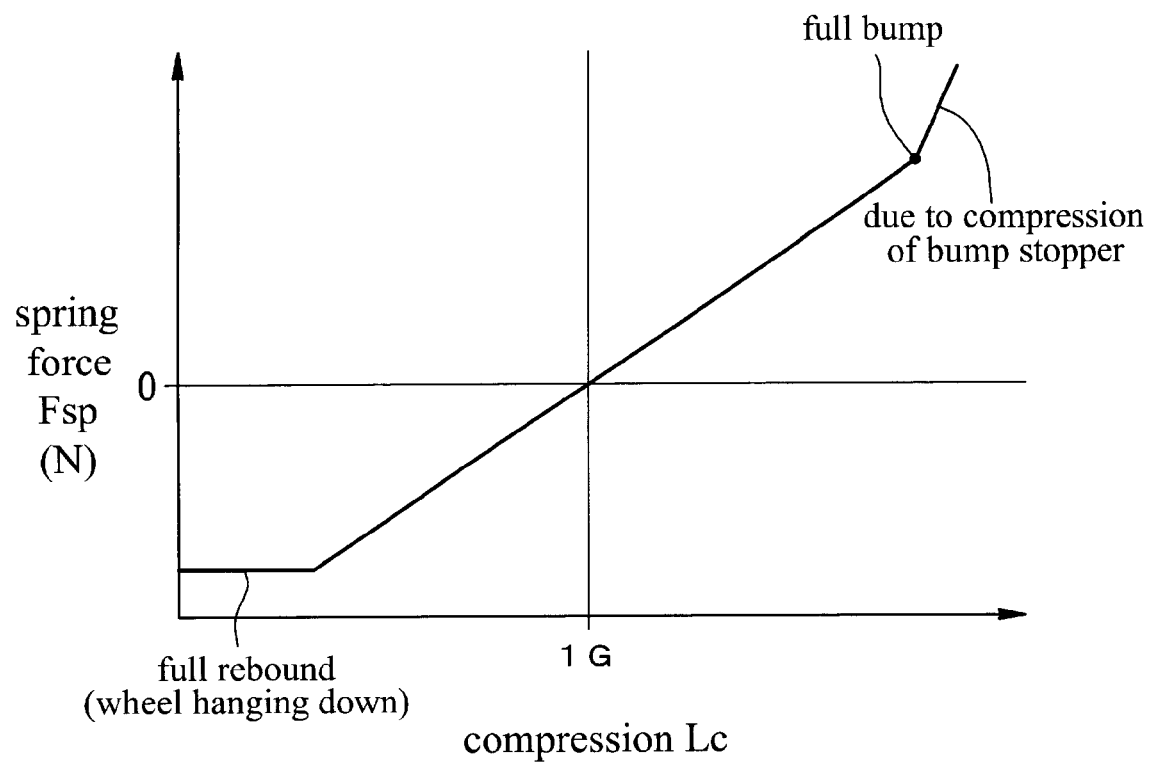
FIG. 20 is graph showing the stroke-spring force map of the third embodiment.

After the target damping force Dt is computed in step S42 or S44, a spring force Fsp that is produced by the spring 6 is looked up from a map illustrated in FIG. 20 according to the current compression Lc of the spring 6 in step S45. The spring force Fsp is scaled so as to be zero when the vehicle is under a one G condition or when the vehicle is traveling over a smooth road surface. The compression Lc of the spring 6 can be obtained by using a map or a formula not shown in the drawing according to the compression of the spring 6 under a one G condition and the stroke signal representing the stroke of the damper 4.

The damper control unit 50 then computes a second damping force correction value Dc2 by multiplying a second gain G2 to the spring force Fsp in step S46, and the second damping force correction value Dc2 is subtracted from the target damping force Dt to obtain a corrected target damping force Dt in step S47.

Figure 21:
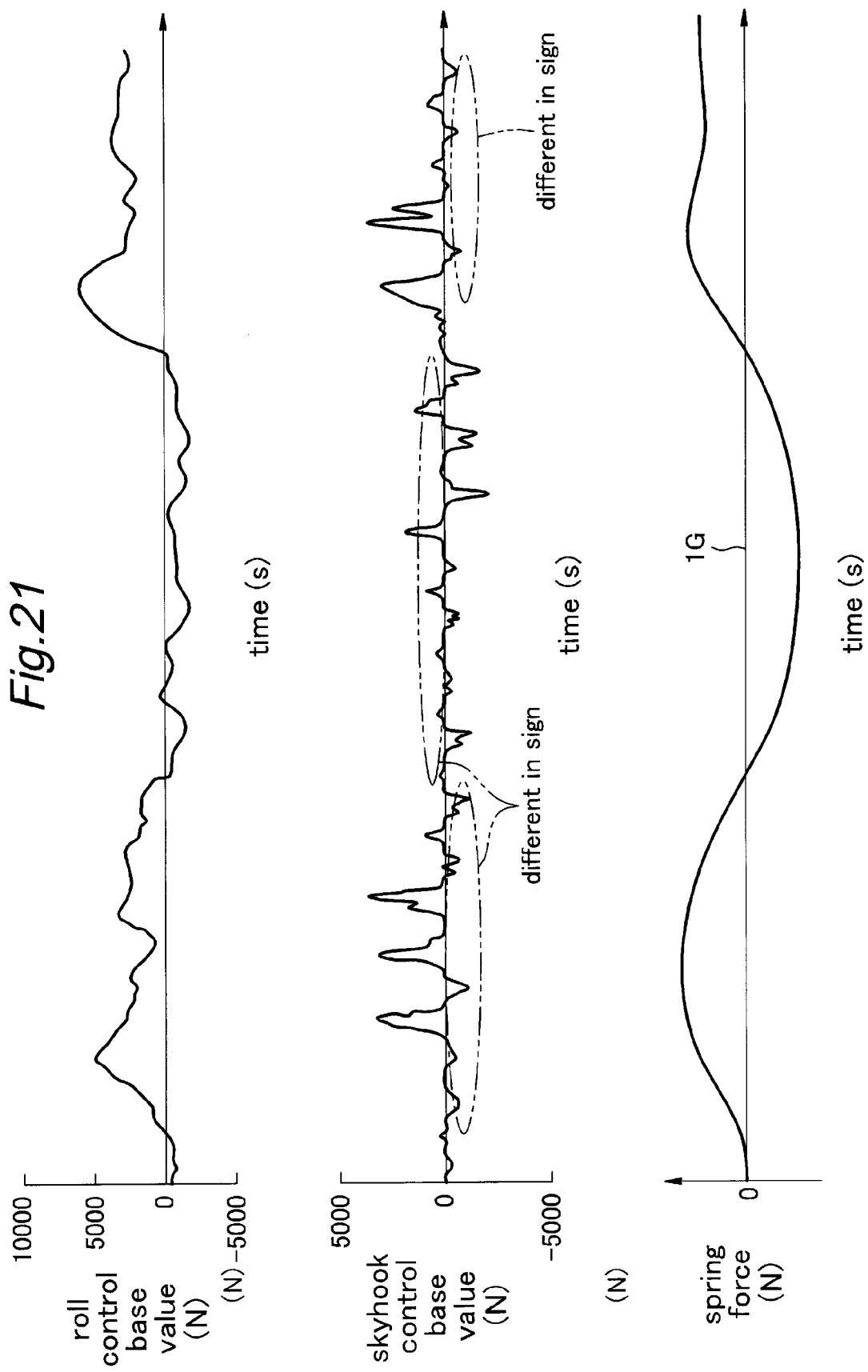
FIG. 21 shows changes in the roll control base value and skyhook control base value with time in the third embodiment.
Figure 22:
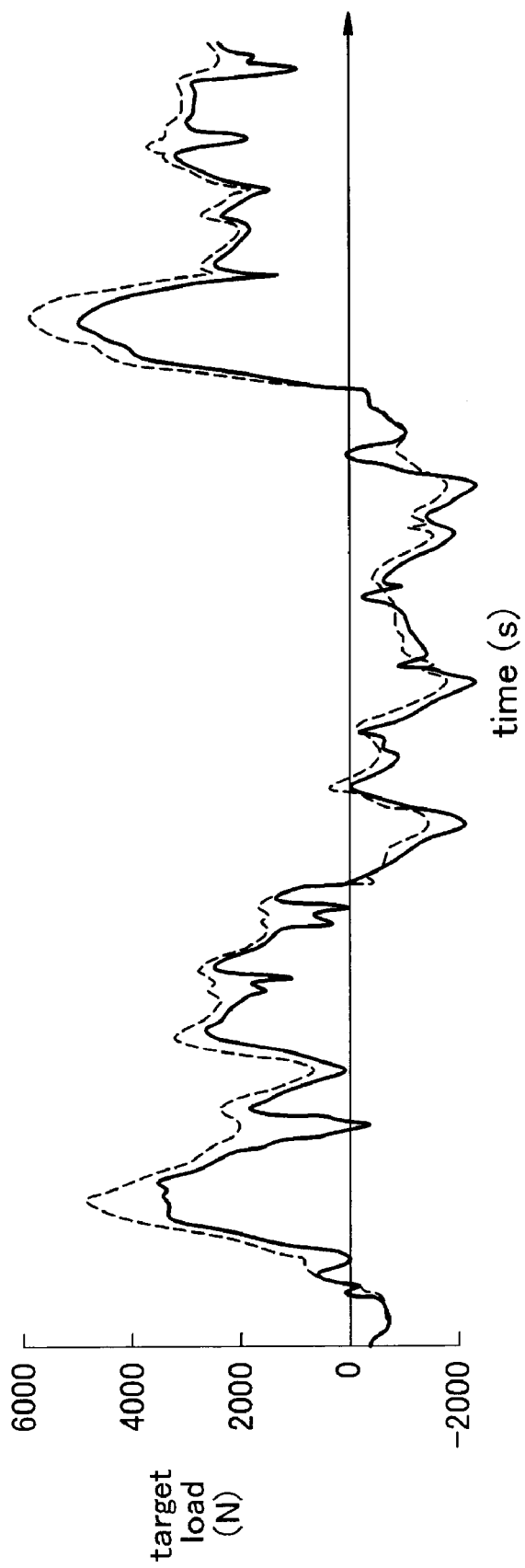
FIG. 22 shows changes in the target control load with time in the third embodiment.

FIG. 21 is a graph showing the changes of the roll control base value Drb, skyhook control base value Dsb and spring force Fsp with time under the same condition as the second embodiment. The roll control base value Drb and skyhook control base value Dsb differ in sign from each other in the regions surrounding by double-dot chain-dot lines, and the changes in the spring force correspond to turning movements of the vehicle V in corresponding directions. Thus, as the damper 4 makes a relatively rapid up and down movement while a roll control is in progress, the absolute value of the target control load (target damping force Dt) is reduced as indicated by the solid lines in FIG. 22, and the resistance to the extending and retracting movement of the damper is reduced in a similar manner as in the previous embodiment. Therefore, the spring 6 on the outer side of the road curve is relatively more compressed (the spring 6 is compressed from the one G condition), and the damping force of the damper 4 of the same side is reduced. Conversely, the spring 6 on the inner side of the road curve is relatively less compressed (the spring 6 is extended from the one G condition), and the damping force of the damper 4 of the same side is reduced. As compared to the second embodiment of the present invention, the vehicle V of the third embodiment is more effective in improving the ride quality and controlling the roll movement of the vehicle V. Similarly as in the second embodiment, the target damping force determining process may be similarly executed when the pitch control base value Dpb is selected as the target damping force base value Db.

Figure 23:
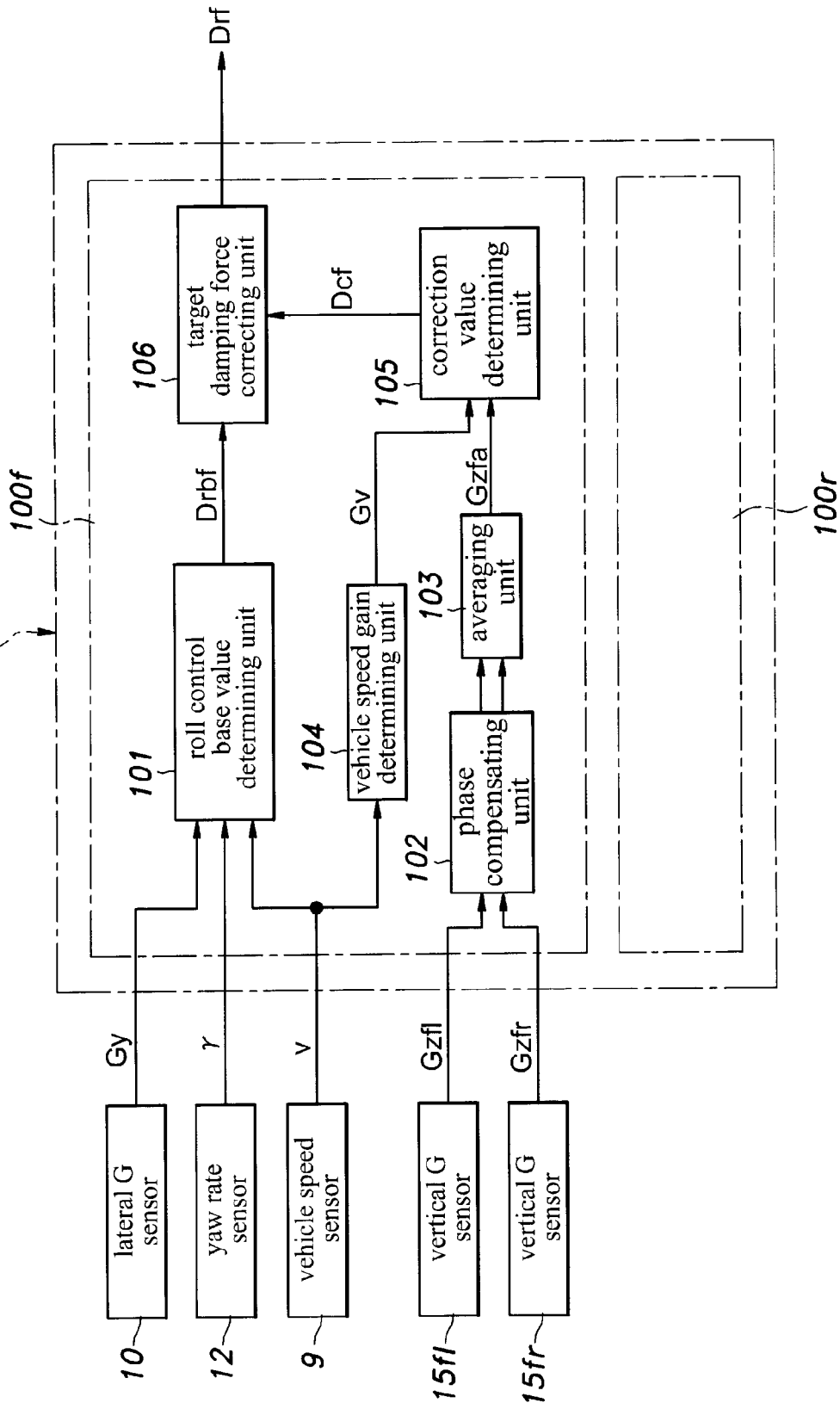
FIG. 23 is a block diagram of the roll control unit of the fourth embodiment.
Figure 24:
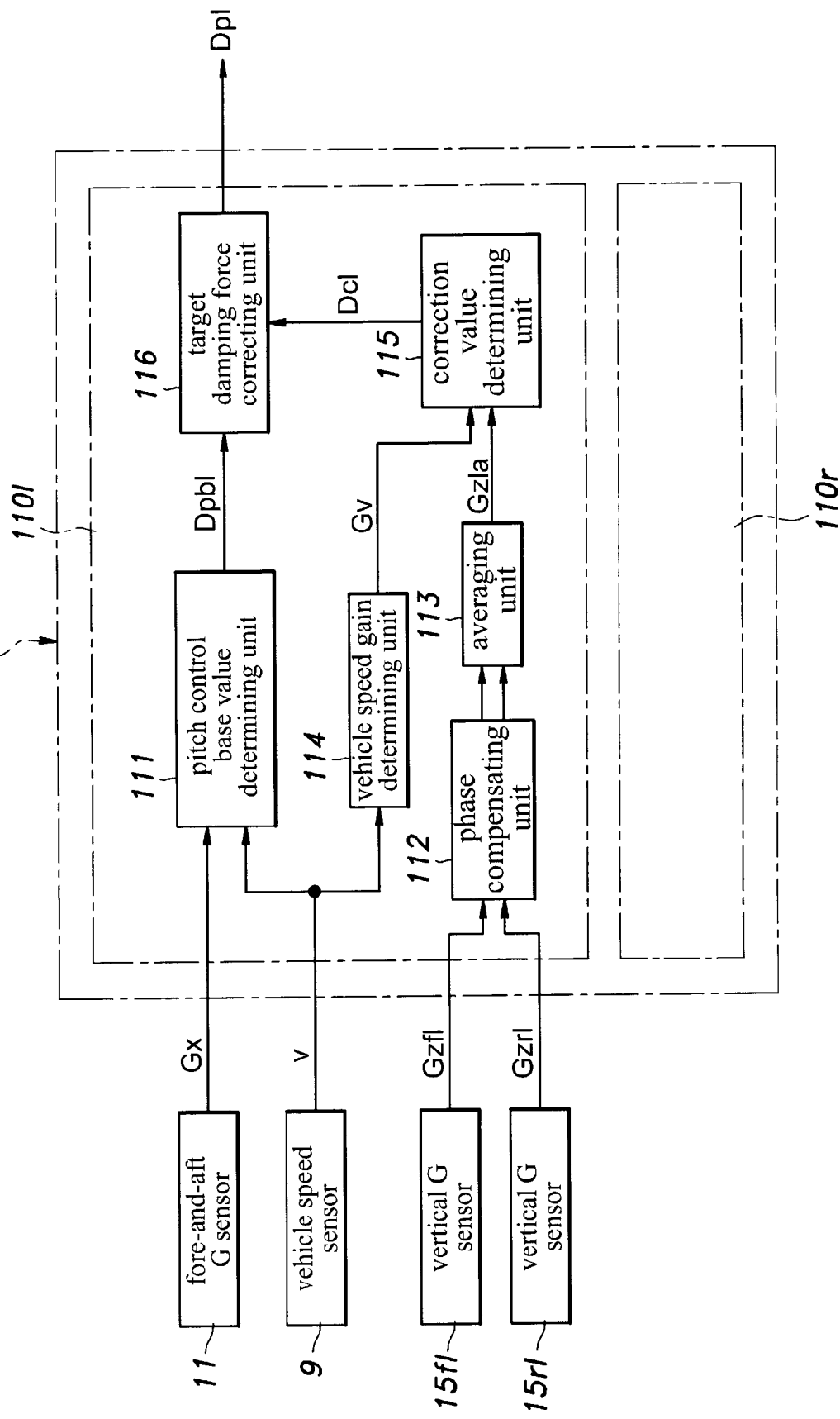
FIG. 24 is a block diagram of the pitch control unit of the fourth embodiment.

FIGS. 23 and 24 are block diagrams of a roll control unit 58 and a pitch control unit 59 of a fourth embodiment of the present invention, respectively. The parts corresponding to those of the previous embodiments are denoted with like numerals without repeating the description of such parts.

As shown in FIG. 23, in this embodiment, the roll control unit 58 consists of a front wheel target damping force determining unit 100f and a rear wheel target damping force determining unit 100r which are provided with a substantially same structure. Only the front wheel target damping force determining unit 100f is discussed in the following description to avoid redundancy. The front wheel target damping force determining unit 100f comprises a roll control base value determining unit 101 for determining a roll control base value Drbf according to a vehicle speed signal v received from the vehicle speed sensor 9, a lateral acceleration signal Gy received from the lateral G sensor 10 and a yaw rate signal γ received from the yaw rate sensor 12, a phase compensating unit 102 for compensating the phase of each of the vertical accelerations Gzfl and Gzfr received from the vertical G sensors 15fl and 15fr provided near the left and right front wheels, respectively, an averaging unit 103 for taking an average (front wheel average value Gzfa) of the left and right vertical accelerations Gzfl and Gzfr, a vehicle speed gain determining unit 104 for determining a vehicle speed gain Gv according to the vehicle speed v, a correction value determining unit 105 for determining a front wheel damping force correction value Dcf according to the front wheel average value Gzfa and vehicle speed gain Gv, and a target damping force determining unit 106 for determining a front wheel roll control target damping force Drf by correcting the roll control base value Drbf by using the front wheel damping force correction value Dcf.

As shown in FIG. 24, in this embodiment, the pitch control unit 59 consists of a left wheel target damping force determining unit 110*l* and a right wheel target damping force determining unit 110*r* which are provided with a substantially same structure. Only the left wheel target damping force determining unit 110*l* is discussed in the following description to avoid redundancy. The left wheel target damping force determining unit 110*l* comprises a pitch control base value determining unit 111 for determining a pitch control base value Dpb1 according to a vehicle speed signal v received from the vehicle speed sensor 9 and a fore-and-aft acceleration signal Gx received from the fore-and-aft G sensor 11, a phase compensating unit 112 for compensating the phase of each of the vertical accelerations Gzfl and Gzrl received from the vertical G sensors 15*fl* and 15*rl* provided near the front and rear left wheels, respectively, an averaging unit 113 for taking an average (left wheel average value Gzla) of the vertical accelerations Gzfl and Gzrl, a vehicle speed gain determining unit 114 for determining a vehicle speed gain Gv according to the vehicle speed v, a correction value determining unit 115 for determining a left wheel damping force correction value Dcl according to the left wheel average value Gzla and vehicle speed gain Gv, and a target damping force determining unit 116 for determining a left wheel pitch control target damping force Dpl by correcting the pitch control base value Dpb1 by using the left wheel damping force correction value Dcl.

Figure 25:
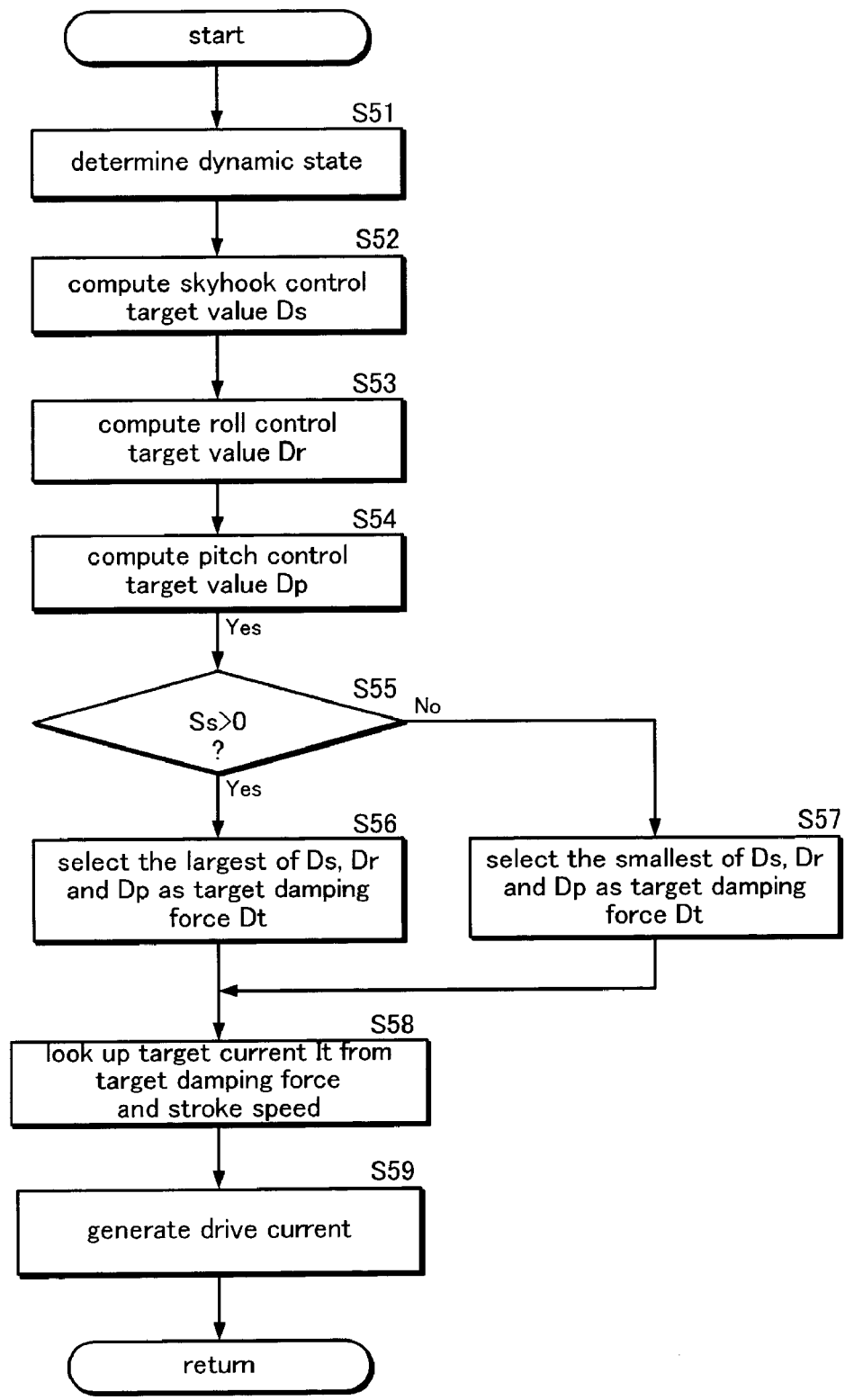
FIG. 25 is a flowchart of the damper control process of the fourth embodiment.

When the vehicle is traveling, the damper control unit 50 performs a damping control represented by the flowchart of FIG. 25 at a prescribed processing interval such as 2 msec. First of all, the dynamic state of the vehicle V is determined according to the various accelerations of the vehicle obtained by the lateral G sensor 10, fore-and-aft G sensor 11 and vertical G sensors 15, the vehicle speed v obtained by the vehicle speed sensor 9 and a steering speed obtained by the steering angle sensor (not shown in the drawing) in step S51. From the dynamic state of the vehicle, a skyhook control target value Ds for each damper 4 is computed in step S52, a roll control target value Dr for each damper 4 is computed in step S53, and a pitch control target value Dp is computed for each damper 4 in step S54.

The damper control unit 50 then determines if the stroke speed Ss of each damper 4 is positive in step S55. If the stroke speed Ss is positive in value (or the damper 4 is extending), the largest value of the three control target values Ds, Dr and Dp is selected as the target damping force Dt in step S56. If the stroke speed Ss is negative in value (or the damper 4 is contracting), the smallest value of the three control target values Ds, Dr and Dp is selected as the target damping force Dt in step S57.

Once the target damping force Dt is determined step S56 or S57, the damper control unit 50 looks up a target current It corresponding to the target damping force Dt from a target current map as presented in the graph of FIG. 6 in step S58. In step S59, the damper control unit 50 then supplies a drive current to the MLV coil 40 of each damper 4 according to the target current It determined in step S58.

Figure 26:
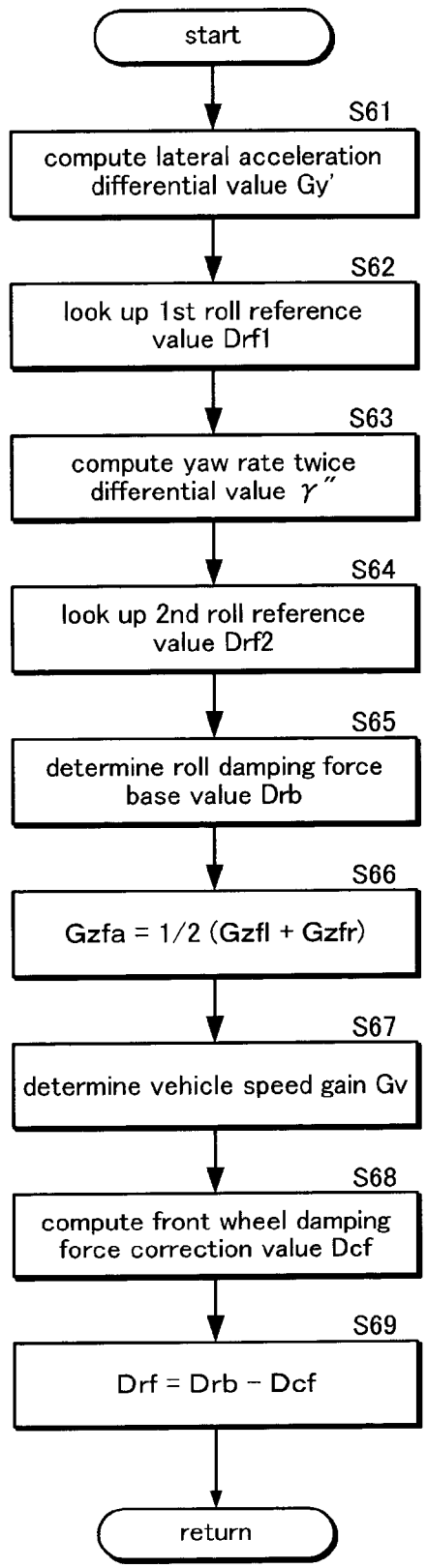
FIG. 26 is a flowchart of the roll target damping force determining process of the fourth embodiment.

Concurrently with the damping control process discussed above, the roll control unit 58 in the damping control unit 50 executes a roll target damping force determining process as represented by the flowchart of FIG. 26 at a prescribed processing interval. In the following is discussed only the process of determining the roll target damping forces for the left and right front wheels, but the process of determining the roll target damping forces for the left and right rear wheels is also executed in a similar fashion.

Figure 27:
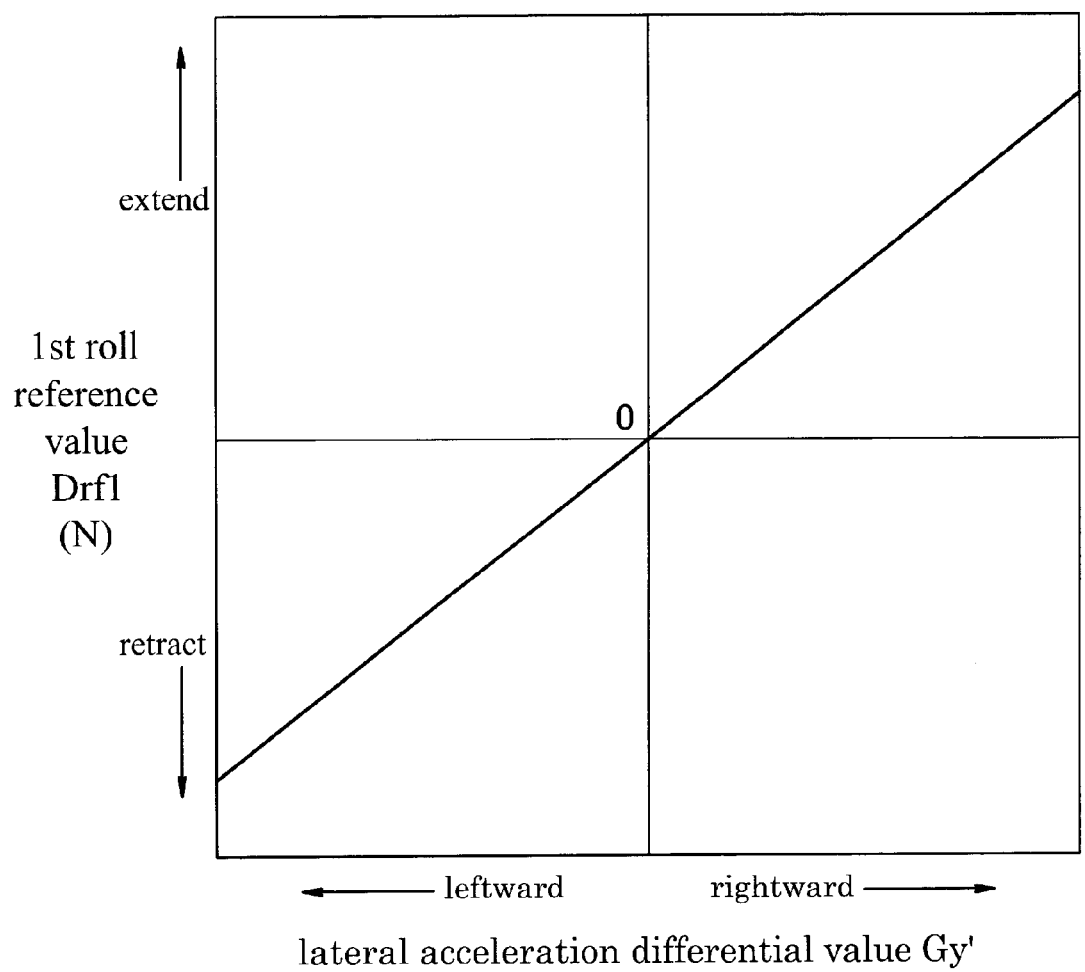
FIG. 27 is a graph showing the relationship between the lateral acceleration and damping force.

First of all, the roll control unit 58 computes a differential value Gy' (lateral acceleration differential value) of the lateral acceleration Gy received from the lateral G sensor 10 in step S61 and looks up a first roll reference value Drf1 by using a lateral acceleration—damping force map shown in FIG. 27 in step S62.

Figure 28:
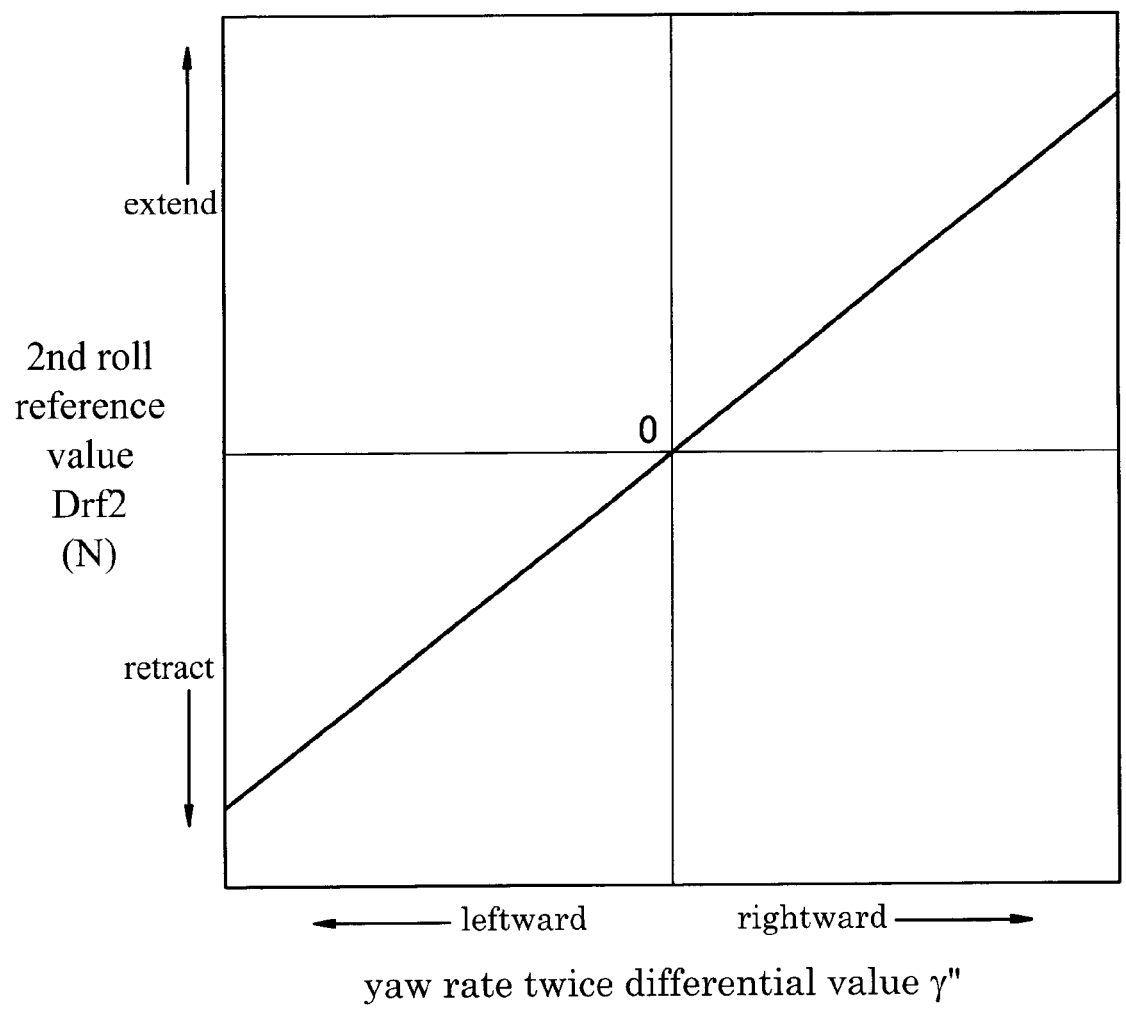
FIG. 28 is a graph showing the relationship between the yaw rate and damping force.

The roll control unit 58 then computes a yaw rate twice differential value γ" (lateral acceleration at the axle) by twice differentiating the yaw rate y received from the yaw rate sensor 12 in step S63, and looks up a second roll reference value Drf2 from a yaw rate—damping force map shown in FIG. 28 in step S64. A roll damping force base value Drb is then determined by multiplying the second roll reference value Drf2 with a prescribed yaw rate gain, adding the product to the first roll reference value Drf1, and multiplying this sum by a vehicle speed gain obtained from a map not shown in the drawing according to the vehicle speed v.

Once the roll damping force base value Drb is determined in step S65, a front wheel average value Gzfa is computed by averaging the vertical accelerations Gzfl and Gzfr corresponding to the left and right front wheels in step 66. A vehicle speed gain Gv is looked up from a map not shown in the drawings in step S67, and a front wheel damping force correction value Dcf is computed by multiplying the vehicle speed gain Gv and a prescribed compensation gain to the front wheel average value Gzfa in step S68. A front wheel roll target damping force Drf is computed by subtracting the front wheel damping force correction value Dcf from the roll damping force base value Drb.

Figure 29A:
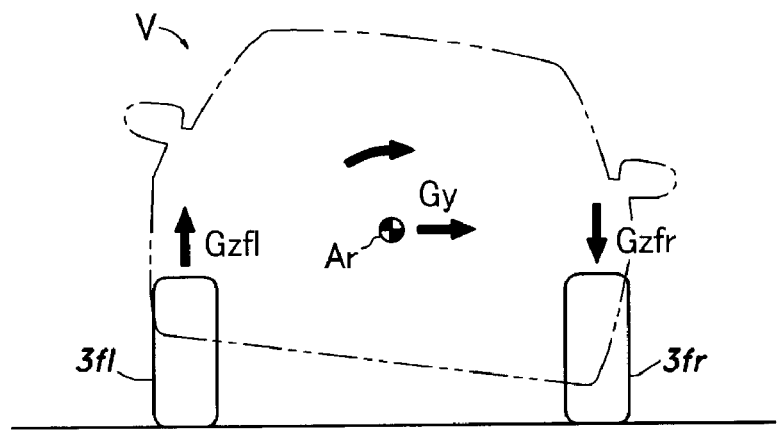
FIGS. 29a, 29b and 29c are diagrams showing the mode of operation of the roll motion control of the fourth embodiment.

Referring to FIG. 29*a*, when the vehicle starts rolling around a roll axis Ar owing to a cornering movement thereof, because the vertical acceleration Gzfl of the left front wheel 3*fl* is equal to the vertical acceleration Gzfr of the right front wheel 3*fr* in value but different therefrom in sign, the front wheel average value Gzfa (or the front wheel damping force correction value Dcf) becomes zero. In this case, when the roll target damping force Dr is selected as the target damping force Dt in the damping force control, because the front wheel roll target damping force Drf is not reduced, the roll movement of the vehicle V is effectively controlled.

Figure 29B:
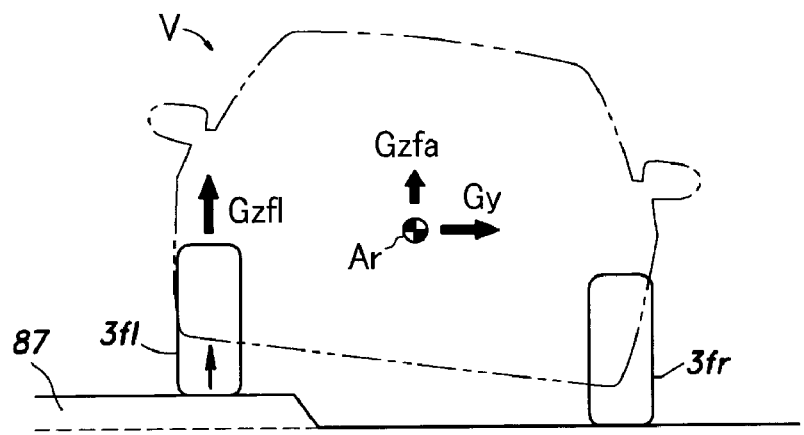

On the other hand, when only one of the wheels (left front wheel 3*fl* in the illustrated case) rides over a step 87 during a cornering movement as shown in FIG. 29*b*, a vertical acceleration Gzfl acts upon the left front wheel 3*fl*, but no vertical acceleration acts upon the right front wheel 3*fr* so that the front wheel average value Gzfa is given as one half of the vertical acceleration Gzfl of the left front wheel 3*fl*. In this case, if the roll target damping force Dr is selected as the target damping force Dt in the damping control, the front wheel roll target damping force Drf is somewhat reduced so that the shock of riding over the step 87 is mitigated, and both a favorable ride quality and a controlled roll movement can be achieved at the same time.

Figure 29C:
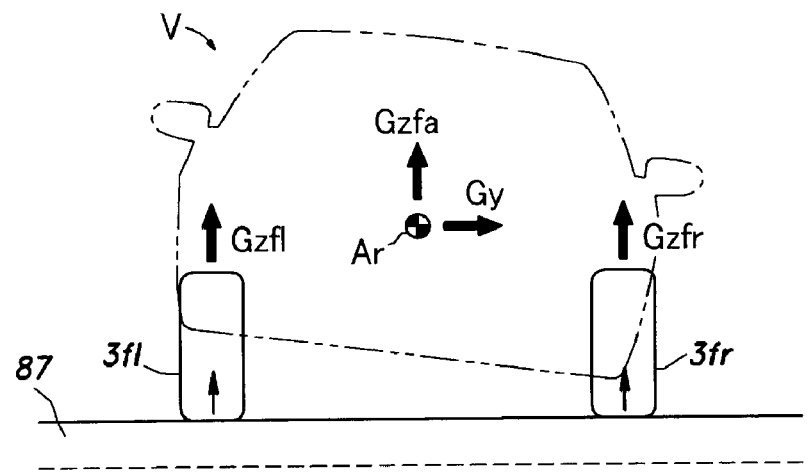

When the left and right front wheels 3*fl* and 3*fr* both ride over a step 87 during a cornering movement as shown in FIG. 29*c*, vertical accelerations Gzfl and Gzfr of a same magnitude act upon the left and right front wheels 3*fl* and 3*fr*, respectively, so that the front wheel average value Gzfa is equal to each of the vertical accelerations Gzfl and Gzfr. Therefore, if the roll target damping force Dr is selected as the target damping force Dt in the damping control, the front wheel roll target damping force Drf is significantly reduced so that the shock of riding over the step 87 is effectively reduced, and a particularly favorable ride quality can be achieved.

Figure 30:
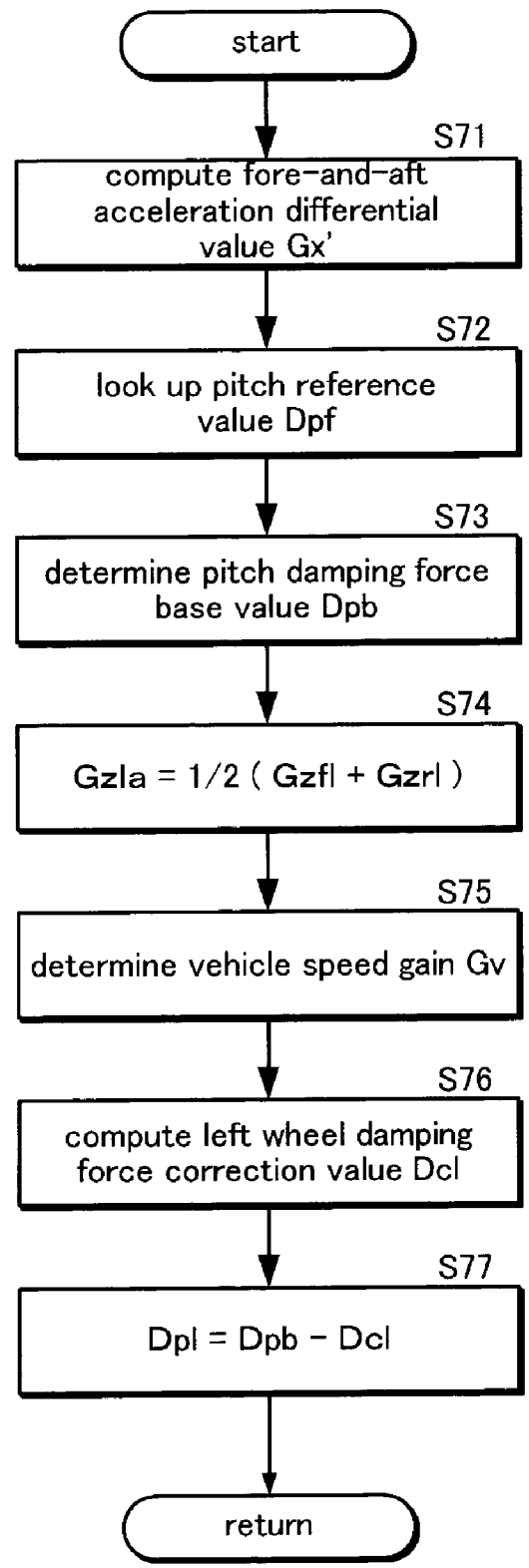
FIG. 30 is a flowchart of the pitch target damping force determining process of the fourth embodiment.

Concurrently with the damping control process discussed above, the pitch control unit 59 in the damping control unit 50 executes a pitch target damping force determining process as represented by the flowchart of FIG. 30 at a prescribed processing interval. In the following is discussed only the process of determining the pitch target damping forces for the front and rear left wheels, but the process of determining the pitch target damping forces for the front and rear right wheels is also executed in a similar fashion.

Figure 31:
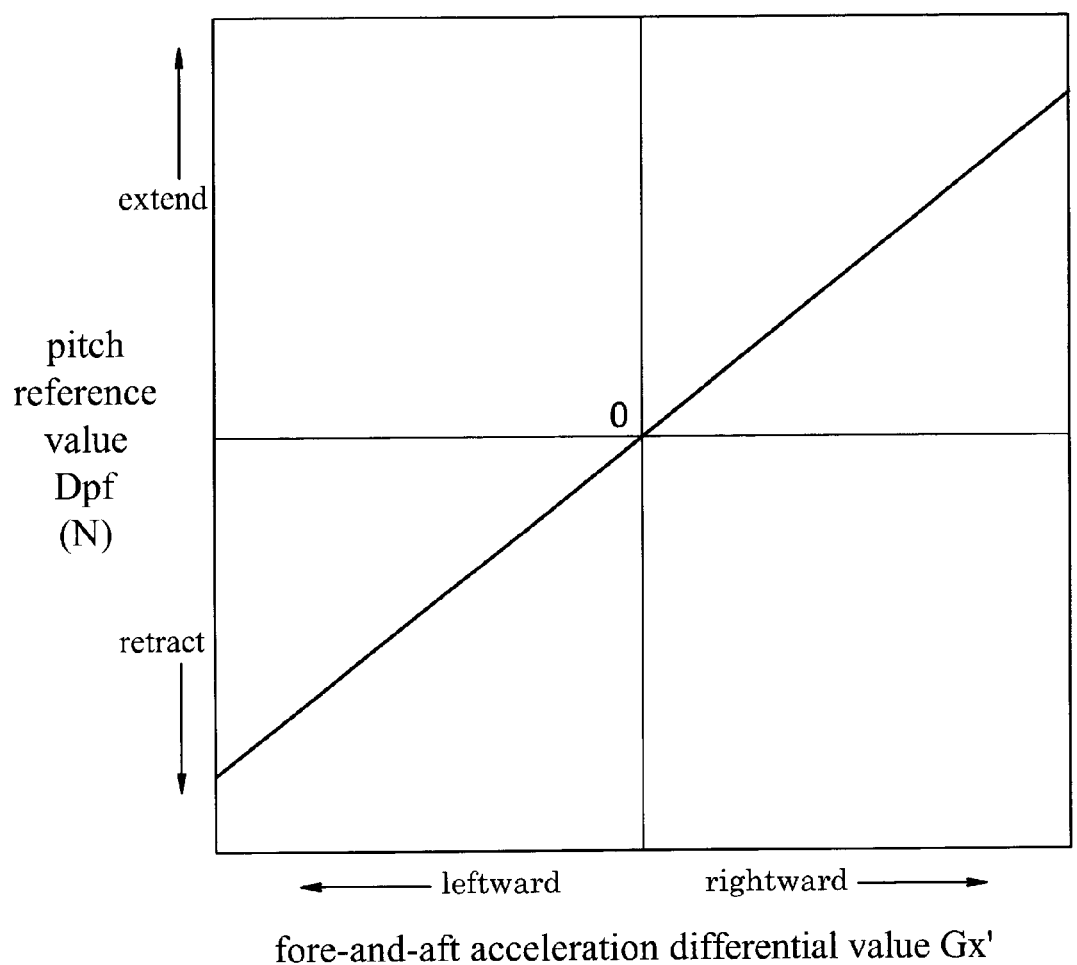
FIG. 31 is a graph showing the relationship between the fore-and-aft acceleration and damping force.

First of all, the pitch control unit 59 computes a differential value Gx' (fore-and-aft acceleration differential value) of the fore-and-aft acceleration Gx received from the fore-and-aft G sensor 11 in step S71 and looks up a pitch reference value Dpf by using a fore-and-aft acceleration—damping force map shown in FIG. 31 in step S72.

The pitch control unit 59 then computes a pitch damping force base value Dpb by multiplying a vehicle speed gain based on the vehicle speed v to the pitch reference value Dpf in step S73.

Once the pitch damping force base value Dpb is determined in step S73, a left wheel average value Gzfl is computed by averaging the vertical accelerations Gzfl and Gzrl corresponding to the front and rear left wheels in step S74. A vehicle speed gain Gv is looked up from a map not shown in the drawings in step S75, and a left wheel damping force correction value Dcl is computed by multiplying the vehicle speed gain Gv and a prescribed compensation gain to the left wheel average value Gzfl in step S76. A left wheel pitch target damping force Dpl is computed by subtracting the left wheel damping force correction value Dcl from the pitch damping force base value Dpb in step S77.

Figure 32A:
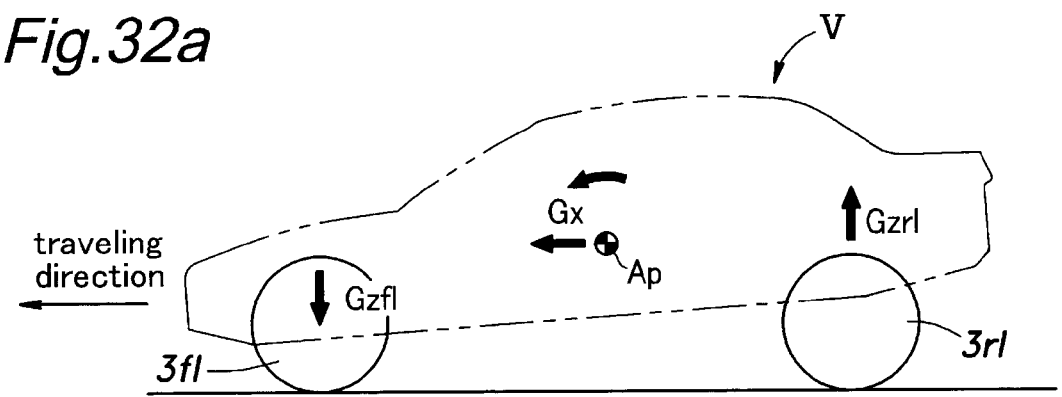
FIGS. 32a, 32b and 32c are diagrams showing the mode of operation of the pitch motion control of the fourth embodiment.

Referring to FIGS. 32a, when the vehicle starts pitching around a pitch axis Ap owing to a decelerating movement thereof, because the vertical acceleration Gzfl of the left front wheel 3fl is equal to the vertical acceleration Gzrl of the left rear wheel 3rl in value but different therefrom in sign, the left wheel average value Gzfl (or the left wheel damping force correction value Dcl) becomes zero. In this case, when the pitch target damping force Dp is selected as the target damping force Dt in the damping force control, because the left wheel pitch target damping force Dpl is not reduced, the pitch movement of the vehicle V is effectively controlled.

Figure 32B:
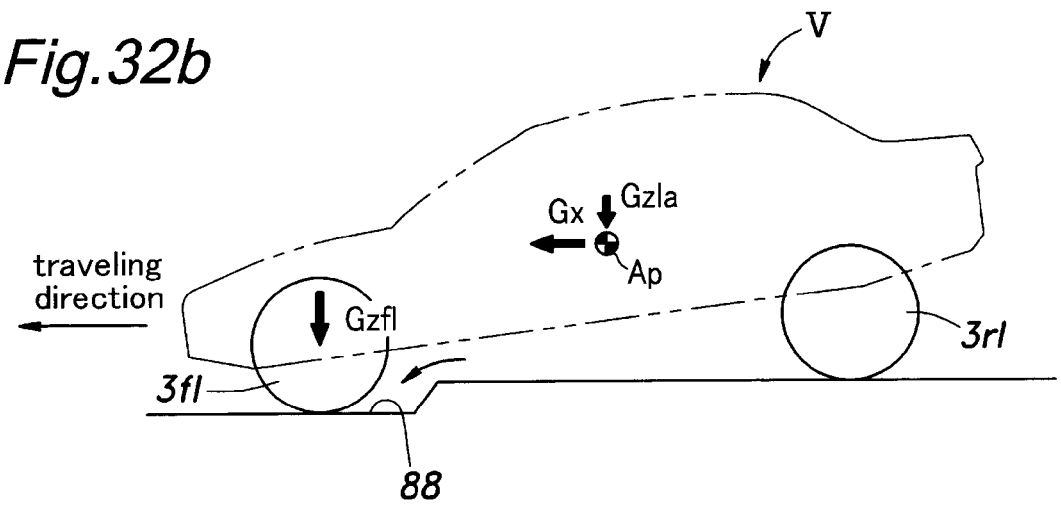

On the other hand, when only one of the wheels (left front wheel 3fl in the illustrated case) falls into a recess 88 during a decelerating movement of the vehicle as shown in FIG. 32b, a vertical acceleration Gzfl acts upon the left front wheel 3fl, but no vertical acceleration acts upon the left rear wheel 3rl so that the left wheel average value Gzla is given as one half of the vertical acceleration Gzfl of the left front wheel 3fl. In this case, if the pitch target damping force Dp is selected as the target damping force Dt in the damping control, the left wheel pitch target damping force Dpl is somewhat reduced so that the shock of dropping into the recess 88 is mitigated, and both a favorable ride quality and a controlled pitch movement can be achieved at the same time.

Figure 32C:
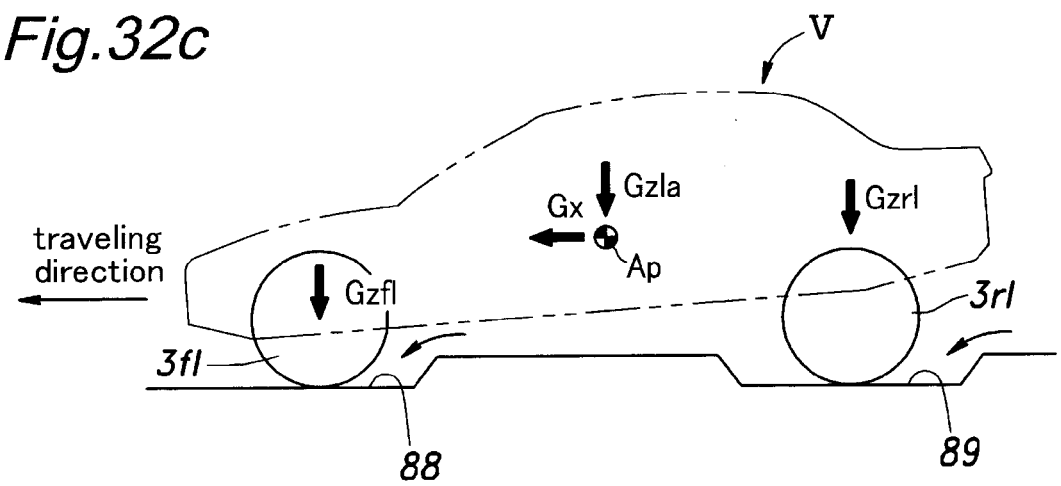

When the front and rear left wheels 3fl and 3rl both drop into recesses 88 and 89, respectively, during a decelerating movement as shown in FIG. 32c, vertical accelerations Gzrl and Gzrl of a same magnitude act upon the front and rear left wheels 3fl and 3rl, respectively, so that the left wheel average value Gzla is equal to each of the vertical accelerations Gzfl and Gzrl. Therefore, if the pitch target damping force Dp is selected as the target damping force Dt in the damping control, the left wheel pitch target damping force Dpl is significantly reduced so that the shock of dropping into the recesses 88 and 89 is effectively reduced, and a particularly favorable ride quality can be achieved.

Figure 34:
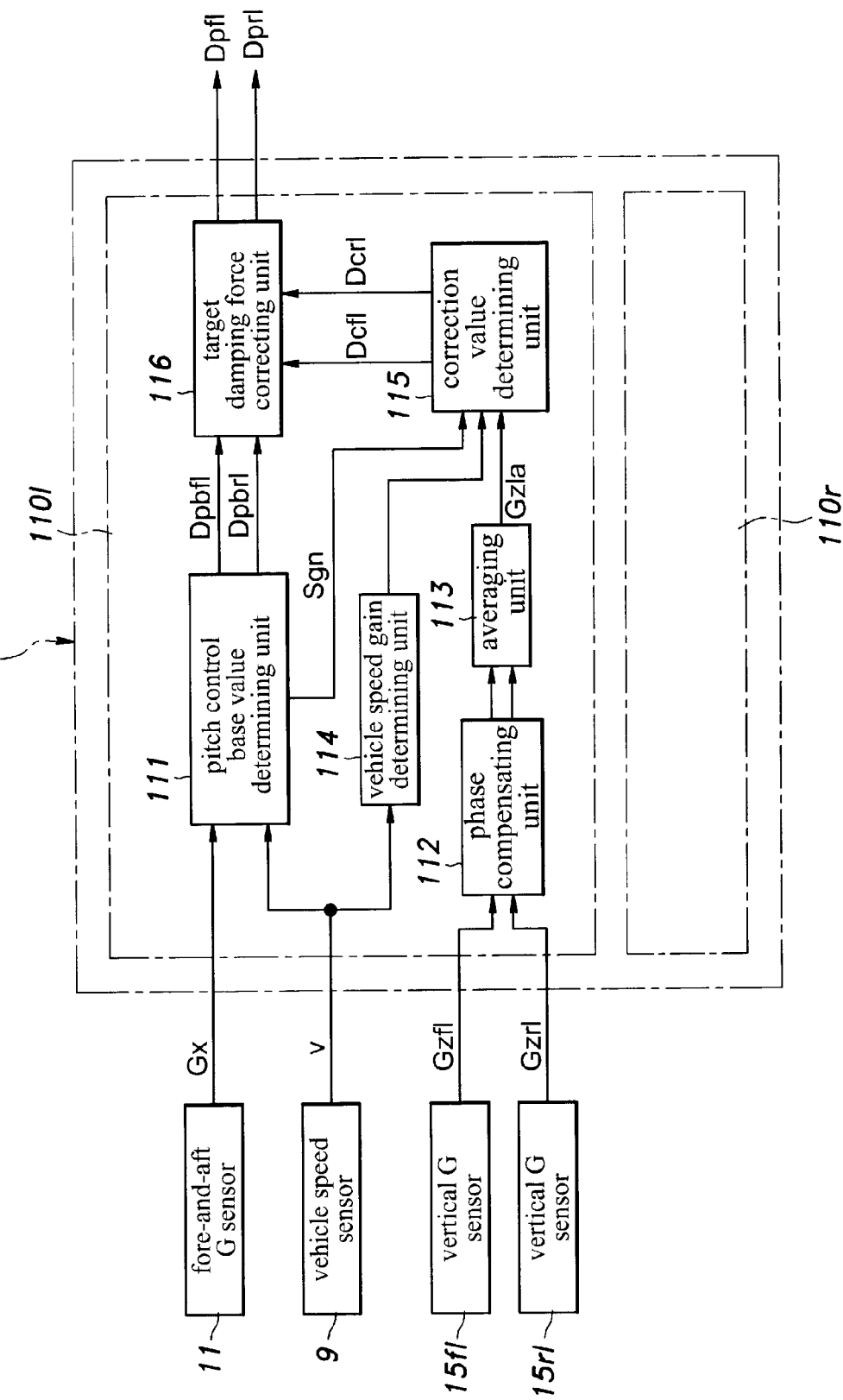
FIG. 34 is a block diagram of the pitch control unit of the fifth embodiment.

FIGS. 33 and 34 are block diagrams of a roll control unit and a pitch control unit of a fifth embodiment of the present invention, respectively. The parts corresponding to those of the previous embodiments are denoted with like numerals without repeating the description of such parts. Also, various control steps similar to those of the previous embodiment are omitted from the description to avoid redundancy.

As shown in FIG. 33, in this embodiment, the roll control unit 58 consists of a front wheel target damping force determining unit 100f and a rear wheel target damping force determining unit 100r which are provided with a substantially same structure. Only the front wheel target damping force determining unit 100f is discussed in the following description to avoid redundancy. The front wheel target damping force determining unit 100f comprises a roll control base value determining unit 101 for determining a front left wheel roll control base value Drbfl and a front right wheel roll control base value Drbfr according to a vehicle speed signal v received from the vehicle speed sensor 9, a lateral acceleration signal Gy received from the lateral G sensor 10 and a yaw rate signal γ received from the yaw rate sensor 12, a phase compensating unit 102 for compensating the phase of each of the vertical accelerations Gzfl and Gzfr received from the vertical G sensors 15fl and 15fr provided near the left and right front wheels, respectively, an averaging unit 103 for taking an average (front wheel average value Gzfa) of the left and right vertical accelerations Gzfl and Gzfr, a vehicle speed gain determining unit 104 for determining a vehicle speed gain Gv according to the vehicle speed v, a correction value determining unit 105 for determining a front left wheel damping force correction value Dcfl and a front right wheel damping force correction value Dcfr according to the front wheel average value Gzfa, vehicle speed gain Gv and a sign signal Sgn received from the roll control base value determining unit 101, and a target damping force determining unit 106 for determining a front left wheel roll control target damping force Drfl and a front right wheel roll control target damping force Drfr by correcting the front left wheel roll control base value Drbfl and a front right wheel roll control base value Drbfr, respectively, by using a front left wheel damping force correction value Dcfl and a front right wheel damping force correction value Dcfr, respectively.

As shown in FIG. 34, in this embodiment, the pitch control unit 59 consists of a left wheel target damping force determining unit 110l and a right wheel target damping force determining unit 110r which are provided with a substantially same structure. Only the left wheel target damping force determining unit 110l is discussed in the following description to avoid redundancy. The left wheel target damping force determining unit 110l comprises a pitch control base value determining unit 111 for determining a front left wheel pitch control base value Dpbfl and a rear left wheel pitch control base value Dpbrl according to the vehicle speed signal v received from the vehicle speed sensor 9 and a fore-and-aft acceleration signal Gx received from the fore-and-aft G sensor 11, a phase compensating unit 112 for compensating the phase of each of the vertical accelerations Gzfl and Gzrl received from the vertical G sensors 15fl and 15rl provided near the front and rear left wheels, respectively, an averaging unit 113 for taking an average (left wheel average value Gzla) of the vertical accelerations Gzfl and Gzrl, a vehicle speed gain determining unit 114 for determining a vehicle speed gain Gv according to the vehicle speed v, a correction value determining unit 115 for determining a front left wheel damping force correction value Dcfl and a rear left wheel damping force correction value Dcrl according to the left wheel average value Gzla, vehicle speed gain Gv and a sign signal Sgn received from the pitch control base value determining unit 114, and a target damping force determining unit 116 for determining a front left wheel pitch control target damping force Dpfl and a rear left wheel pitch control target damping force Dprl by correcting the front left wheel pitch control base value Dpbfl and a rear left wheel pitch control base value Dpbrl, respectively, by using a front left wheel damping force correction value Dcfl and a rear left wheel damping force correction value Dcrl, respectively.

When the vehicle is traveling, the damper control unit 50 performs a damping control represented by the flowchart of FIG. 25 at a prescribed processing interval such as 2 msec.

Figure 35:
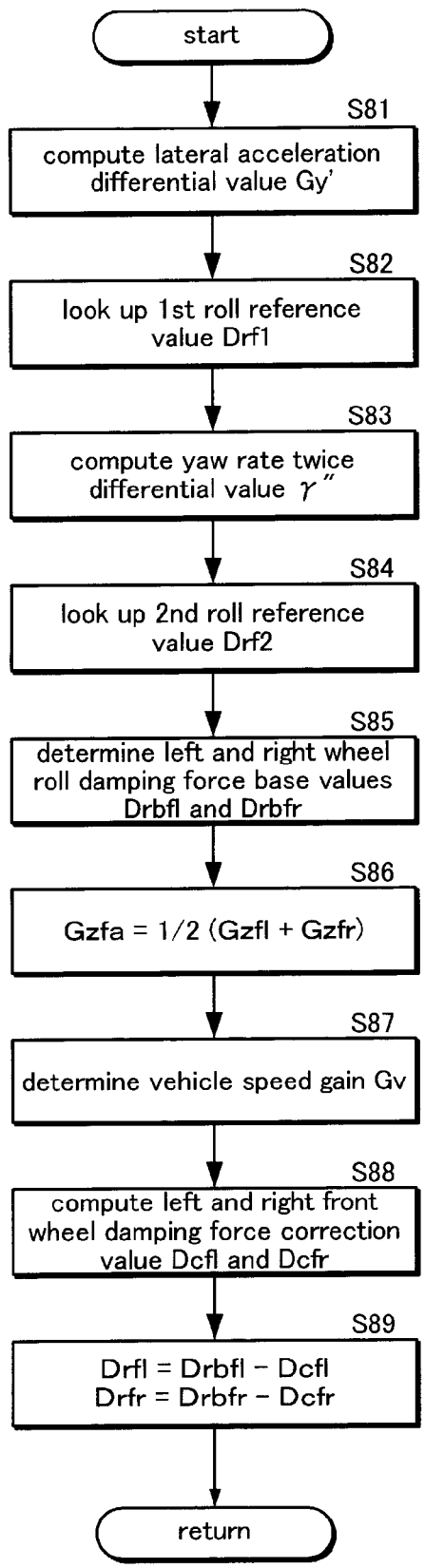
FIG. 35 is a flowchart of the roll target damping force determining process of the fifth embodiment.

Concurrently with the damping control process discussed above, the roll control unit 58 in the damping control unit 50 executes a roll target damping force determining process as represented by the flowchart of FIG. 35 at a prescribed processing interval. In the following is discussed only the process of determining the roll target damping forces for the left and right front wheels, but the process of determining the roll target damping forces for the left and right rear wheels is also executed in a similar fashion.

First of all, the roll control unit 58 computes a differential value Gy' (lateral acceleration differential value) of the lateral acceleration Gy received from the lateral G sensor 10 in step S81 and looks up a first roll reference value Drfl by using a lateral acceleration—damping force map shown in FIG. 27 in step S82.

The roll control unit 58 then computes a yaw rate twice differential value γ" (lateral acceleration at the axle) by twice differentiating the yaw rate γ received from the yaw rate sensor 12 in step S83, and looks up a second roll reference value Drf2 from a yaw rate—damping force map shown in FIG. 28 in step S84. A left front wheel roll control base value Drbfl and a right front wheel roll control base value Drbfr are respectively computed by multiplying the second roll base value Drb2 with a prescribed yaw rate gain, adding the product to the first roll base value Drb1, multiplying this sum with a vehicle speed gain obtained from a map not shown in the drawing according to the vehicle speed v, and taking into account the sign of the lateral acceleration differential value Gy' in step S85.

Once the left front wheel roll control base value Drbfl and right front wheel roll control base value Drbfr are determined in step S85, a front wheel average value Gzfa is computed by averaging the vertical accelerations Gzfl and Gzfr corresponding to the left and right front wheels in step S86. A vehicle speed gain Gv is looked up from a map not shown in the drawings in step S87, and a left and right front wheel damping force correction values Dcfl and Dcfr are computed by multiplying the vehicle speed gain Gv and a prescribed compensation gain to the front wheel average value Gzfa and taking into account the sign Sgn of the lateral acceleration differential value Gy' received from the roll control base value determining unit 101 in step S88. A left front wheel roll target damping force Drfl is computed by subtracting the left front wheel damping force correction value Dcfl from the left front wheel roll damping force base value Drbfl, and a right front wheel roll target damping force Drfr is computed by subtracting the right front wheel damping force correction value Dcfr from the right front wheel roll damping force base value Drbfr in step S89.

Figure 36:
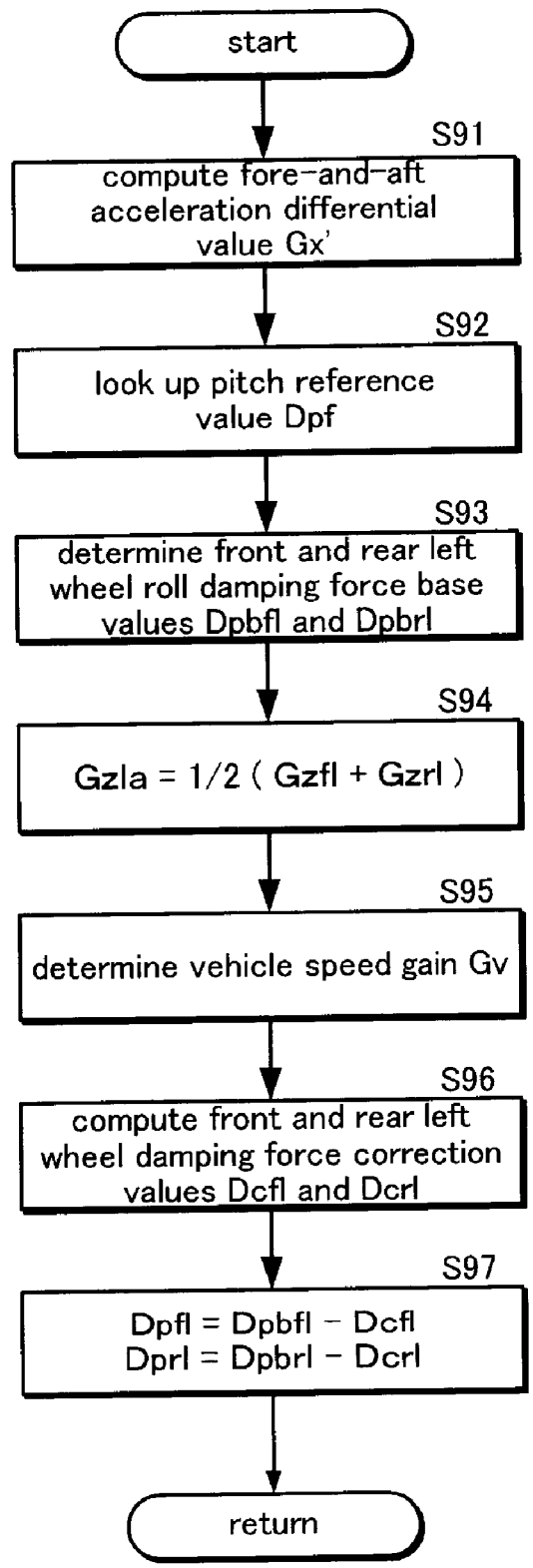
FIG. 36 is a flowchart of the pitch target damping force determining process of the fifth embodiment.

Concurrently with the damping control process discussed above, the pitch control unit 59 in the damping control unit 50 executes a pitch target damping force determining process as represented by the flowchart of FIG. 36 at a prescribed processing interval. In the following is discussed only the process of determining the pitch target damping forces for the front and rear left wheels, but the process of determining the pitch target damping forces for the front and rear right wheels is also executed in a similar fashion.

First of all, the pitch control unit 59 computes a differential value Gx' (fore-and-aft acceleration differential value) of the fore-and-aft acceleration Gx received from the fore-and-aft G sensor 11 in step S91 and looks up a pitch reference value Dpf by using a fore-and-aft acceleration—damping force map shown in FIG. 31 in step S92.

The pitch control unit 59 then computes a front left wheel pitch damping force base value Dpbfl and a rear left wheel pitch damping force base value Dpbrl by multiplying a vehicle speed gain based on the vehicle speed v to the pitch reference value Dpf in step S93.

Once the front left wheel pitch damping force base value Dpbfl and rear left wheel pitch damping force base value Dpbrl are determined in step S93, a left wheel average value Gzla is computed by averaging the vertical accelerations Gzfl and Gzrl corresponding to the front and rear left wheels in step S94. A vehicle speed gain Gv is looked up from a map not shown in the drawings in step S95, and a front left wheel damping force correction value Dcfl and a rear left wheel damping force correction value Dcrl are computed by multiplying the vehicle speed gain Gv and a prescribed compensation gain to the left wheel average value Gzla in step S96. A front left wheel pitch target damping force Dpfl is computed by subtracting the front left wheel damping force correction value Dcfl from the front left pitch damping force base value Dpbfl, and a rear left wheel pitch target damping force Dprl is computed by subtracting the rear left wheel damping force correction value Dcrl from the rear left pitch damping force base value Dpbrl in step S97.

The fifth embodiment is similar to the fourth embodiment regarding the advantages and mode of operation thereof, but can achieve an even further improvement regarding both the control of the roll and pitch movements and improvement in the ride quality as the roll and pitch target damping forces can be individually determined.

Although the present invention has been described in terms of preferred embodiments thereof, it is obvious to a person skilled in the art that various alterations and modifications are possible without departing from the scope of the present invention which is set forth in the appended claims. For instance, The contents of the original Japanese patent applications on which the Paris Convention priority claim is made for the present application, as well as those of the prior art references mentioned in the present application are hereby incorporated in this application by reference. Also, one feature of a certain embodiment may be incorporated into another embodiment without departing from the spirit of the present invention.

The invention claimed is:

1. A control device for controlling a variable damper of a wheel suspension system, comprising:
   a first sensor detecting a first dynamic state variable of a vehicle body, wherein the first dynamic state variable is one of a lateral acceleration, a fore and aft acceleration and a yaw rate;
   a damping force base value determining unit determining a target damping force base value according to the first dynamic state variable of the vehicle body;
   a second sensor detecting a second dynamic state variable of the vehicle body different from the first dynamic state variable wherein the second state variable comprises a vertical acceleration of a wheel supported by the wheel suspension system;

a correction value determining unit determining a damping force correction value according to the detected second dynamic state variable; and a target damping force determining unit determining a target damping force by modifying the target damping force base value by using the damping force correction value.

2. The control device for controlling a variable damper of a wheel suspension system according to claim 1, wherein the target damping force is obtained by subtracting the damping force correction value from the target damping force base value.

3. A control device for controlling a variable damper of a wheel suspension system, comprising:
a first sensor detecting a first dynamic state variable of a vehicle body;
a damping force base value determining unit determining a target damping force base value according to the first dynamic state variable of the vehicle body;
a second sensor detecting a second dynamic state variable of the vehicle body different from the first dynamic state variable;
a correction value determining unit determining a damping force correction value according to the detected second dynamic state variable; and
a target damping force determining unit determining a target damping force by modifying the target damping force base value by using the damping force correction value;
wherein the damping force base value includes a first damping force base value based on a roll movement of the vehicle body and a second damping force base value based on a vertical movement of the vehicle body, and the control device further comprises a target damping force selecting unit selecting one of the first and second damping force base values according to a prescribed criteria, the target damping force determining unit determining the target damping force by modifying one of the first and second damping force base values selected by the target damping force selecting unit by using the other of the first and second damping force base values when the first and second damping force base values differ from each other in sign.

4. The control device for controlling a variable damper of a wheel suspension system according to claim 3, wherein the target damping force selecting unit selects one of the first and second damping force base values that is greater than the other when a stroke speed of the damper is positive in value, and one of the first and second damping force base values that is smaller than the other when a stroke speed of the damper is negative in value.

5. The control device for controlling a variable damper of a wheel suspension system according to claim 3, wherein the correction value determining unit computes the damping force correction value by multiplying a prescribed gain to the second damping force base value, and the target damping force determining unit determines the target damping force by adding the damping force correction value to the target damping force base value.

6. The control device for controlling a variable damper of a wheel suspension system according to claim 3, wherein the damping force base value further includes a third damping force base value based on a pitch movement of the vehicle body, and the target damping force selecting unit selects one of the first to third damping force base values according to a prescribed criteria, the target damping force being modified by using the second damping force base value when the third damping force base value is selected as the target damping force by the target damping force selecting unit, and the second and third damping force base values differ from each other in sign.

7. The control device for controlling a variable damper of a wheel suspension system according to claim 6, wherein the target damping force selecting unit selects a largest of the first to third damping force base values in value when a stroke speed of the damper is positive in value, and a smallest of the first to third damping force base values in value when a stroke speed of the damper is negative in value.

8. The control device for controlling a variable damper of a wheel suspension system according to claim 3, wherein a spring member is interposed between the wheel and vehicle body, and the target damping force determining unit modifies the target damping force by using the second damping force base value and a spring force produced by the spring member.

9. The control device for controlling a variable damper of a wheel suspension system according to claim 8, further comprising a spring force estimating unit estimating the spring force according to a detected deformation of the spring member or a relative displacement between the wheel and vehicle body.

10. The control device for controlling a variable damper of a wheel suspension system according to claim 9, wherein the correction value determining unit determines a first damping force correction value according to the second damping force base value and a second damping force correction value according to the spring force estimated by the spring force estimating unit, the target damping force determining unit modifying the target damping force by adding the first damping force correction value to and subtracting the second damping force correction value from the target damping force selected b the target damping force selecting unit.

11. The control device for controlling a variable damper of a wheel suspension system according to claim 1, wherein the second dynamic state variable comprises a vertical movement of a part associated with each wheel, and the correction value determining unit determines a damping force correction value according to vertical movements of parts of the vehicle body located on either side of a horizontal axial line around which the vehicle body is turning.

12. The control device for controlling a variable damper of a wheel suspension system according to claim 11, wherein the part associated with each wheel is located on the wheel itself.

13. The control device for controlling a variable damper of a wheel suspension system according to claim 11, wherein the dam ping force correction value is computed from an average value of vertical movements of the laterally or longitudinally adjacent pair of wheels, and the target damping force determining unit obtains the target damping force by modifying the target damping force base value of each of the pair of wheels by using the damping force correction value.

14. A method for controlling a variable damper of a wheel suspension system, comprising:
detecting a first dynamic state variable of a vehicle body;
determining a target damping force base value according to the first dynamic state variable of the vehicle body;
detecting a second dynamic state variable of the vehicle body different from the first dynamic state variable wherein the second dynamic state variable comprises a vertical movement of a part associated with each wheel and located on the wheel itself;
determining a damping force correction value according to the detected second dynamic state variable;

determining a damping force correction value according to vertical movements of parts of the vehicle body located on either side of a horizontal axial line And which the vehicle body turning; and determining a target damping force by modifying the target damping force base value according to the damping force correction value.

15. A method for controlling a variable damper of a wheel suspension system, comprising:

detecting a first dynamic state variable of a vehicle body;

determining a target damping force base value according to the first dynamic state variable of the vehicle body;

detecting a second dynamic state variable of the vehicle body different from the first dynamic state variable;

determining a damping force correction value according to the detected second dynamic state variable;

determining a target damping force by modifying the target damping force base value according to the damping force correction value;

wherein the damping force base value includes a first damping force base value based on a roll movement of the vehicle body and a second damping force base value based on a vertical movement of the vehicle body, and the method further comprises selecting one of the first and second damping force base values according to a prescribed criteria, the target damping force being determined by modifying one of the first and second damping force base values by using the other of the first and second damping force base values when the first and second damping force base values differ in sign.

16. The method for controlling a variable damper of a wheel suspension system according to claim 15, wherein the damping force base value further includes a third damping force base value based on a pitch movement of the vehicle body, and the method further comprises selecting one of the first to third damping force base values according to a prescribed criteria, and modifying the target damping force by using the second damping force base value when the third damping force base value is selected as the target damping force, and the second and third damping force base values differ from each other in sign.

17. The method for controlling a variable damper of a wheel suspension system according to claim 15, wherein the damping force correction value is computed by multiplying a prescribed gain to the second damping force base value, and the target damping force is determined by adding the damping force correction value to the target damping force base value.

18. The method for controlling a variable damper of a wheel suspension system according to claim 15, wherein a spring member is interposed between the wheel and vehicle body, and the target damping force is modified by using the second damping force base value and a spring force produced by the spring member.

19. The control device for controlling a variable damper of a wheel suspension system according to claim 1, wherein the damping force base value determining unit is configured to select the target damping force base value from those based on a roll control, a pitch control and a skyhook control.

20. The method for controlling a variable damper of a wheel suspension system according to claim 15, wherein the target damping force base value is selected from those based on a roll control, a pitch control and a skyhook control.

* * * * *